United States Patent
Schaaper et al.

(10) Patent No.: US 10,485,724 B2
(45) Date of Patent: Nov. 26, 2019

(54) ROLLATOR-TROLLEY WITH ADJUSTABLE HANDLE POSITION DEPENDING ON USE

(71) Applicant: BOBErgo B.V., The Hague (NL)

(72) Inventors: Martijn Schaaper, Monster (NL); Hugo Van De Watering, The Hague (NL); Jan Willem De Joode, Gouda (NL)

(73) Assignee: BOBERGO B.V., The Hague (NL)

(*) Notice: Subject to any disclaimer, the term of this patent is extended or adjusted under 35 U.S.C. 154(b) by 0 days.

(21) Appl. No.: 15/553,331

(22) PCT Filed: Feb. 24, 2016

(86) PCT No.: PCT/NL2016/050134
§ 371 (c)(1),
(2) Date: Aug. 24, 2017

(87) PCT Pub. No.: WO2016/137322
PCT Pub. Date: Sep. 1, 2016

(65) Prior Publication Data
US 2018/0116899 A1    May 3, 2018

(30) Foreign Application Priority Data
Feb. 24, 2015   (NL) .................................. 2014343

(51) Int. Cl.
*A61H 3/04*    (2006.01)
*B62B 3/02*    (2006.01)
(Continued)

(52) U.S. Cl.
CPC ............... *A61H 3/04* (2013.01); *B62B 3/02* (2013.01); *A61H 2003/002* (2013.01);
(Continued)

(58) Field of Classification Search
CPC ... B62B 1/042; B62B 3/022; B62B 7/06–066; B62B 7/08–086
See application file for complete search history.

(56) References Cited

U.S. PATENT DOCUMENTS

| | | | |
|---|---|---|---|
| 4,428,598 A * | 1/1984 | Kassai | B62B 7/08 280/42 |
| 6,561,536 B2 * | 5/2003 | Suzuki | B62B 7/06 280/47.36 |
| 2017/0326019 A1 * | 11/2017 | Bramsiepe | A61H 3/04 |

FOREIGN PATENT DOCUMENTS

| | | |
|---|---|---|
| CN | 102711705 A | 10/2012 |
| CN | 203619856 U | 6/2014 |

(Continued)

OTHER PUBLICATIONS

International Search Report PCT/NL2016/050134 dated Jul. 12, 2016.
(Continued)

*Primary Examiner* — Erez Gurari
(74) *Attorney, Agent, or Firm* — Pillsbury Winthrop Shaw Pittman, LLP

(57) ABSTRACT

Rollator-trolley assembly comprising a preferably continuously arranged bracket shaped handle at a rear upper side of the assembly, wherein the bracket shaped handle is pivotally adjustable between a rollator position, in which the bracket shaped handle is substantially directed to a front side, and a trolley position, in which the bracket shaped handle is substantially directed towards a rear side; wherein free walking space is provided between the wheels of the rollator-trolley assembly in the rollator position.

13 Claims, 20 Drawing Sheets

(51) Int. Cl.
    *A61H 3/00*    (2006.01)
    *B62B 5/04*    (2006.01)
    *B62B 5/06*    (2006.01)
(52) U.S. Cl.
    CPC .................. *A61H 2003/046* (2013.01); *A61H 2201/0161* (2013.01); *A61H 2201/0192* (2013.01); *B62B 5/0447* (2013.01); *B62B 5/0476* (2013.01); *B62B 5/065* (2013.01)

(56) References Cited

FOREIGN PATENT DOCUMENTS

| EP | 0759735 B1 | 9/1998 |
| EP | 2366372 A1 | 9/2011 |
| JP | 2002-282314 A | 10/2002 |
| KR | 10-2014-0002433 A | 1/2014 |

OTHER PUBLICATIONS

The First Office Action issued in corresponding Chinese Patent Application No. 201680017964.4 dated May 5, 2019 with English translation.
International Preliminary Report on Patentability and Written Opinion of the International Searching Authority issued in corresponding International Application No. PCT/NL2016/050134 dated Aug. 29, 2017.
First Office Action dated May 5, 2019 issued in corresponding Chinese Patent Application No. 201680017964.4 with English translation.

* cited by examiner

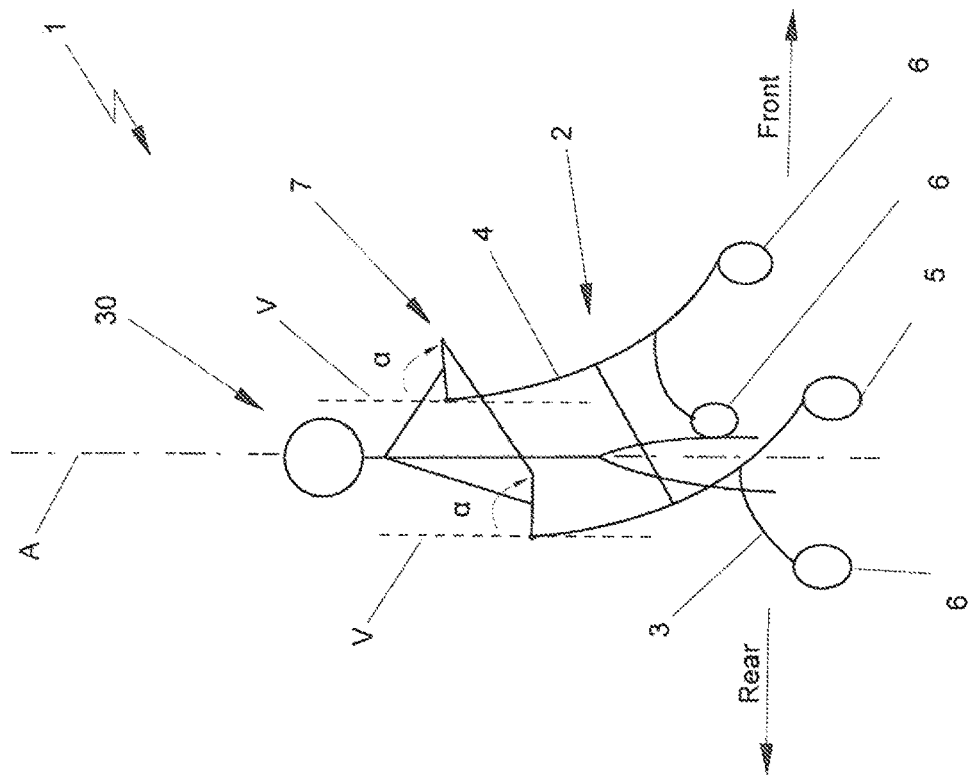
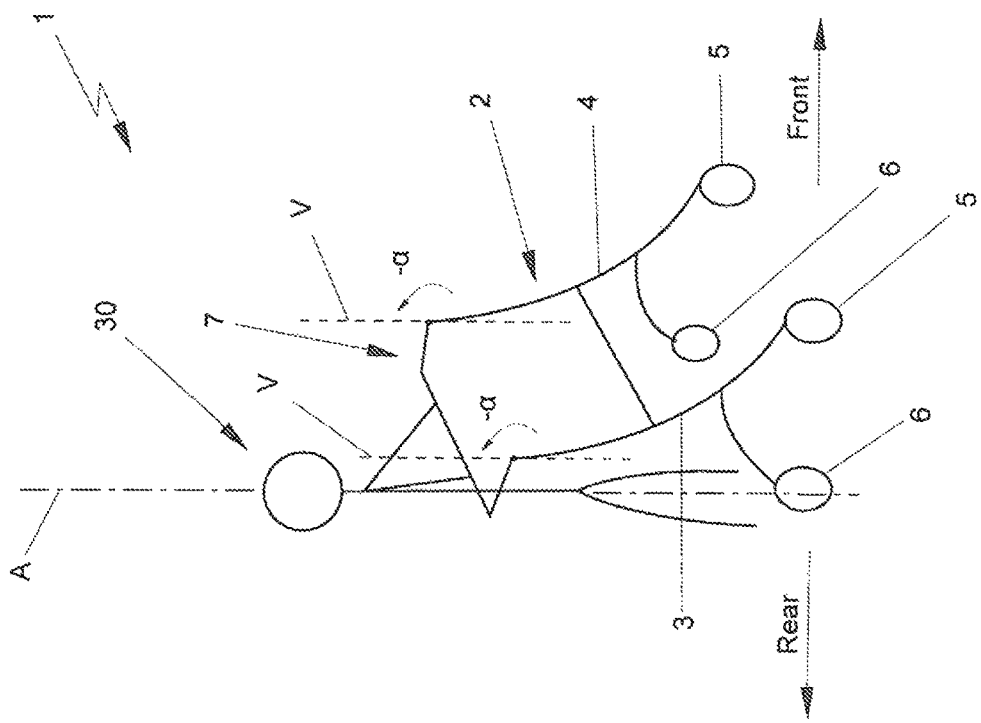

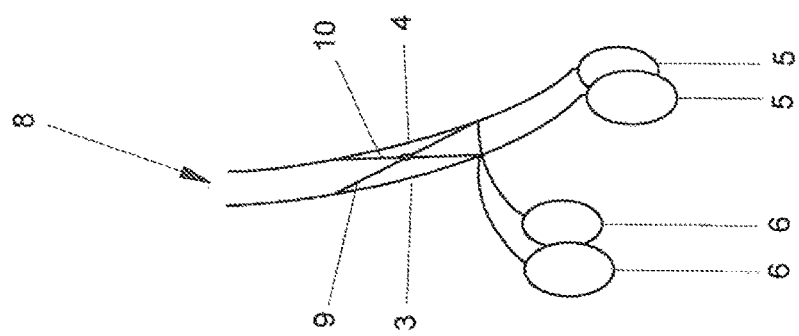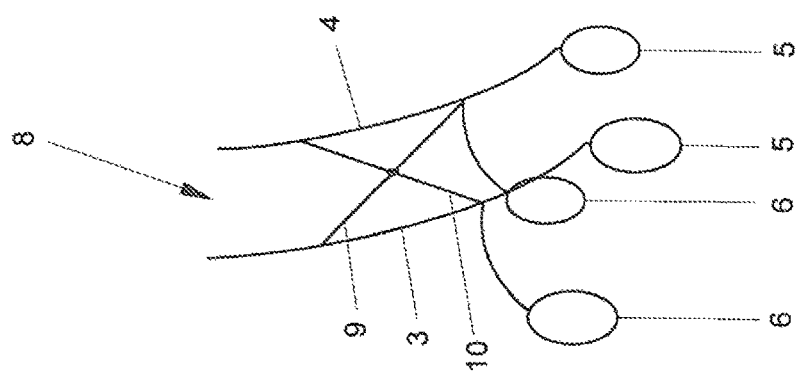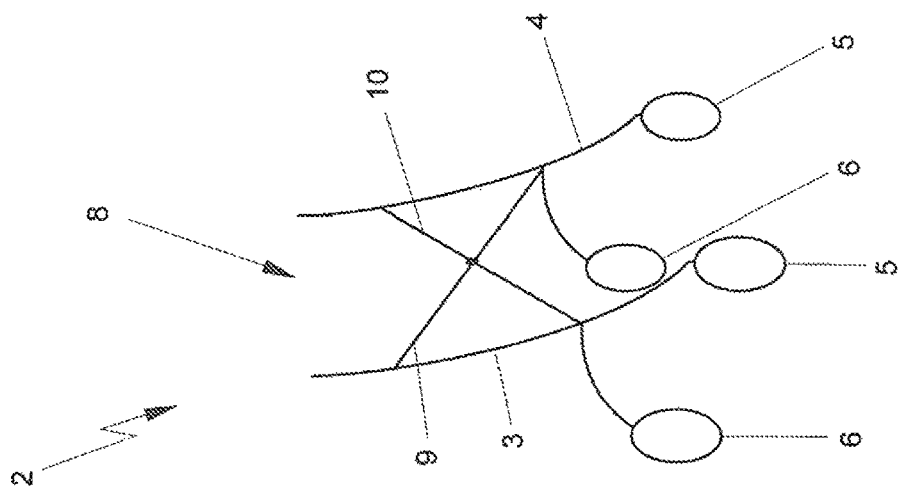

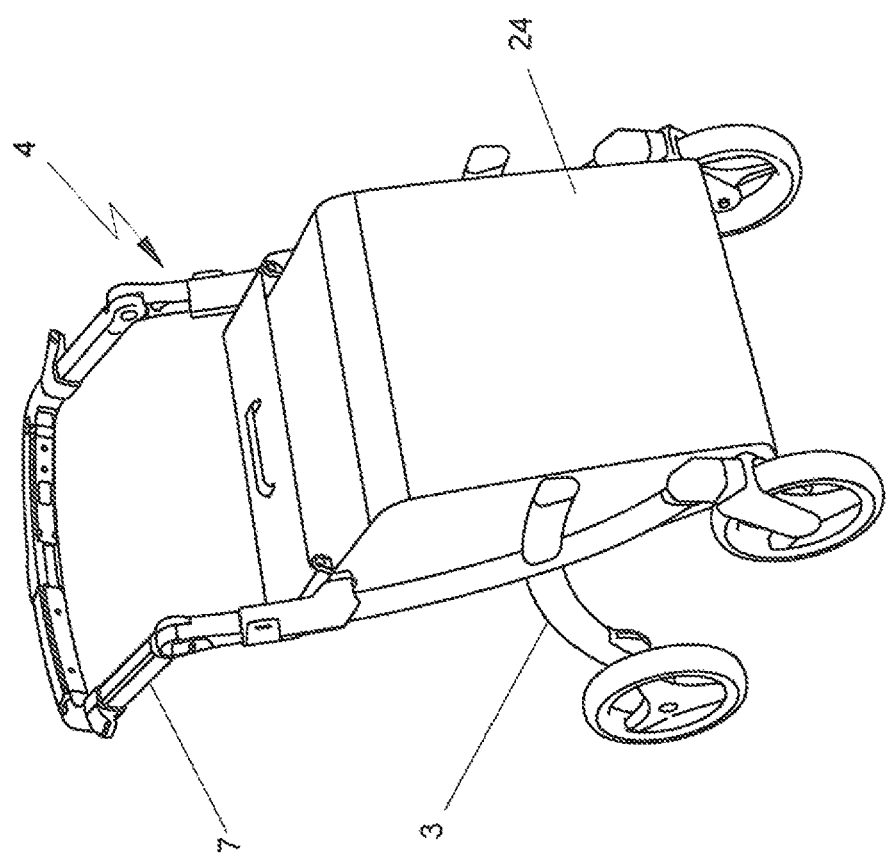

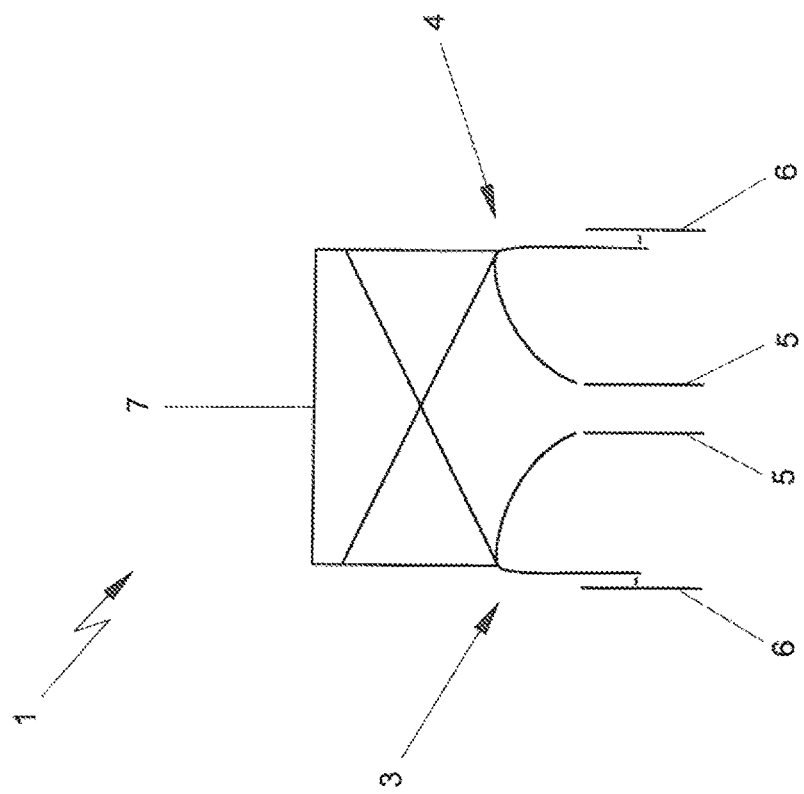
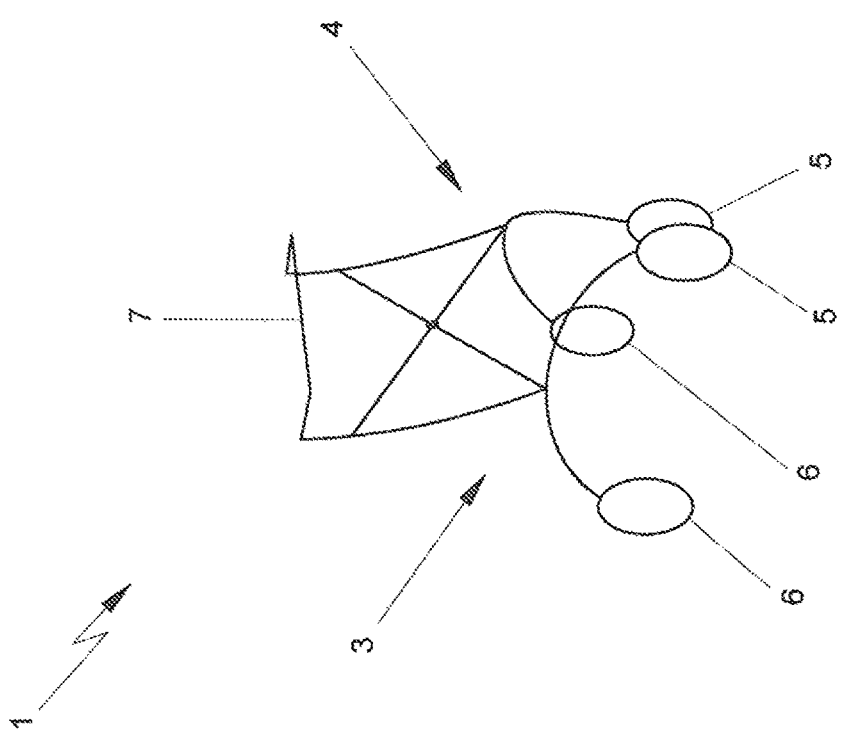
Fig. 18a
Fig. 18b

ROLLATOR-TROLLEY WITH ADJUSTABLE HANDLE POSITION DEPENDING ON USE

CROSS-REFERENCE TO RELATED APPLICATIONS

This is the U.S. National Stage of PCT/NL2016/050134, filed Feb. 24, 2016, which claims priority to Netherlands Patent Application No. 2014343, filed Feb. 24, 2015, the contents of each of these applications being incorporated herein by reference in their entireties.

The invention relates to a rollator-trolley assembly.

A rollator is typically used by people having difficulties with walking. The rollator makes, as a walking aid device, walking easier, and enables the people, with e.g. physical disabilities or other conditions that can hinder walking, to travel more conveniently by foot. The device helps reducing the burden carried by the user's lower limbs, consequently improving the mobility of the user.

Often, rollators are designed relatively large and heavy, so as to provide sufficient stability and/or load carrying capacity. However, these properties can make the rollator cumbersome to use and/or more demanding to maneuver, because of the difficult and/or complex user handling of the device. Furthermore, these characteristics of the rollator attribute to certain implicit visual indications, well known to the public, that the user has some sort of disability or medical condition.

Using the rollator, may sometimes have a social and/or emotional impact on the user. For example, using the rollator in public may have a social impact as the user may be treated differently and/or may be seen as a person with a reduced mobility. The public may have difficulties to accept the appearance of the rollator.

On the person or user itself, using the rollator may have an emotional impact. Users tend to postpone the use of a rollator as it may confront them with their reduced mobility. The acceptance of the rollator for users may be limited in view of a possible negative social and/or emotional impact. On the other hand, there may be users with a reduced walking mobility for which some walking assistance may be welcome, but for which a rollator may be overdesigned. For such persons, adequate walking aids may be poorly available and may insufficiently address their needs.

Publication KR 10-2014-0002433 discloses a shopping cart device of which the handlebar is adjustable between a rearward position in which the device can be pushed as a shopping cart and a forward position in which the user can lend on the handling bar. A drawback of this device is that, in the forward position of the handlebar, the user stands behind the rear wheels, while the arms of the user rest on the handlebar in front of the rear wheels. This gives an awkward and/or instable position to the user and does not provide comfort for walking.

So, there is a need for a rollator that addresses at least one of the above mentioned drawbacks. It is an object of the invention to provide for a rollator that obviates at least one of the above mentioned drawbacks, while maintaining the advantages.

Thereto, the invention provides for a rollator-trolley assembly according to claim 1.

Generally, a rollator, or walker, can be seen as a walking aid device providing support for the user, comprising a frame, at least three wheels contacting a supporting surface, at least one handle for manipulation of the device by forces applied by both arms, wherein the handle is arranged in such a way to prevent the rollator from turning over when the user applies supporting loads on the device through the handgrips arranged on the handle. The supporting loads can be seen as vertical loading forces, which preferably intersect with, or fall within, a support plane segment, that is bounded by the contact points of the wheels with the supporting surface, to prevent turning over of the rollator during support, wherein the user preferably walks inside the support plane segment during use of the rollator, i.e. a vertical line extending from the user's center of mass intersects with the support plane segment.

The rollator-trolley assembly according to the invention can lessen the emotional burden that the rollator users bear when in public places, because it has more the visual characteristics of a trolley or cart, while including the walking aid functionality of the rollator.

By providing a rollator-trolley assembly with a handle which can be adjusted between a rollator position, in which the handle is mainly directed to the front of the assembly, and a trolley position, in which the handle is mainly directed to the rear of the assembly, the device can be configured by the user depending on the use, thereby combining the functionality of the two separate devices, i.e. rollator and trolley device, and eliminating the above-mentioned disadvantages of both said devices when configured appropriately by the user depending on the condition and needs. When the rollator-trolley device is configured as a rollator, the user will, when in operation, lean on the device and walk between the rear wheels of the rollator for optimal stability and support. Conversely, when the rollator-trolley device is configured as a trolley, the user will, when in operation, tend to push the device and walk behind the rear wheels of the trolley.

By providing a rollator-trolley assembly, comprising a frame including at least two spaced apart interconnected lateral frame sides, wherein at a bottom side of each lateral frame side at least one front wheel and at least one rear wheel is provided, the frame further comprising a bracket shaped handle at a rear upper side of the frame continuously arranged at the two lateral frame sides, wherein the handle is pivotally adjustable between a rollator position, in which the handle is directed to a front side of the assembly, and a trolley position, in which the handle is directed towards a rear side of the assembly; wherein a transverse distance between the at least two lateral frame sides provides a free walking space between the at least two rear wheels in the rollator position, wherein the front wheels and the rear wheels define a support plane segment, that is bounded by the contact points of the wheels with a supporting surface, wherein the user walks inside the support plane segment during use in rollator position.

The handle can be provided as a bracket shaped handle that is continuously arranged between the lateral frame sides. By providing a continuously arranged bracket shaped handle, the handle can be easily adjusted between the rollator position and the trolley position and/or every position in between. Alternatively, the handle can be provided as two handle parts, wherein each lateral frame side has a handle part at its end. These handle parts can be individually adjusted between the rollator position and the trolley position. Preferably, the handle parts can be adjusted together, for example, when there is a mechanical connection between the handle parts, e.g. a bar, or when there is a digital or other connection between the handle parts as to synchronously adjust the handle parts between the rollator position and the trolley position. Many variants may be possible of providing a handle to the rollator-trolley assembly. For the handle, it is important that the handle is adjustable between the rollator position, in which the handle is mainly directed to the front of the assembly, and a trolley position, in which the handle is mainly directed towards the rear of the assembly. In the rollator position of the handle, a free walking space between the at least two rear wheels is provided for the user. As such, in the rollator position, a space between the rear wheels can be obtained in which the user can walk in a support plane segment defined by the front wheels and the rear wheels, that is bounded by the contact points of the wheels with a supporting surface, wherein the user walks inside the support plane segment during use with the handle in rollator position. By providing a free walking space between the rear wheels, in the rollator position, the user can walk in the support plane segment, and this may provide for a stable and reliable support for the user during walking, thus the rollator-trolley assembly functioning as a walking aid (rollator) in the rollator position to optimally support the user. Advantageously, a bracket shaped handle may provide for more support to the user, as the positions at which the user may hold the handle are less defined for a bracket shaped handle. As such, the user has more flexibility in holding the device. In an advantageous embodiment, the handle can be adjusted by pivoting, but also other ways of adjusting are possible, e.g. by means of a ratchet, etc.

Also, risks of wrongful or erroneous usage of the trolley device as a walking aid may be reduced, preventing the user falling down and risking further injury due to instability of the trolley, due to, for example, inappropriate leaning down on the device by the user.

Some users may mainly utilize the device in the rollator configuration, while other users may mainly utilize the device in the trolley configuration, depending on for example their walking abilities, the usage patterns and/or habits.

The rollator-trolley assembly according to the current invention includes a frame comprising at least two lateral profiles which are spaced-apart and interconnected. At the bottom side of each lateral profile at least one front wheel and at least one rear wheel is provided. The frame further comprises a handle at the rear upper side of the frame preferably continuously arranged between the two lateral profiles. Adjusting means are provided so that the rollator-trolley device is configurable, by a user, between two positions, namely a rollator position and a trolley position, by changing the position of the handle. A transverse distance between the at least two profiles provides a free walking space between the at least two rear wheels in the rollator position. The adjustment means for adjusting the device in positions between a rollator position and a trolley position are provided to optimize the user's interaction with equipment depending on the working conditions.

Advantageously, the handle, e.g. a bracket shaped handle, may be adjustably arranged around an axis transverse to the lateral profiles, enabling the user to adjust the handle in a relatively easy way, between a rollator position and a trolley position. The user's preference can change in function of different dynamic aspects, such as for example user habits, tiredness, parkour change, and other user needs for optimally assisting with walking. The handle can then, with respect to the user's personal preferences, be adjusted in a fast and efficient way.

In another embodiment, the profiles of the frame may be arranged generally uniformly or generally similar in shape, and the assembly substantially symmetrical with respect to a longitudinal median plane. This arrangement can avoid substantial difference in stiffness and mass between the lateral profiles, enhancing the maneuverability and stability of the device.

In a preferred embodiment, the frame may be provided with a carrying system arranged to carry a container. The container can be fixedly connected or detachably connected with the carrying system comprised on the frame. The container can have different sizes and shapes. Further, the carrying system can be arranged to carry different types of containers, which can be selected by the user, depending on the user's requirements and/or preferences.

In an embodiment, the lateral profiles may each be provided with at least one profile.

In a further embodiment the frame comprises first lateral profiles to which a rear wheel is mountable, and further comprises second lateral profiles to which a front wheel is mountable. When the device is in use, the frame of the rollator-trolley assembly is carried by the wheels, which are in contact with supporting surface, e.g. ground. The handle is operated by the user and loads can be transferred from the handle through the profiles to the wheels potentially reducing the burden carried by the user's lower limbs. In use of the device, the bracket shaped handle can provide more stability for the user.

Advantageously, the first and second lateral profiles may be connected to form a lateral side of the frame, enhancing the stiffness, stability and/or mobility.

In another embodiment, a folding body may be provided between the lateral profiles, so that the assembly is adjustable between a folded-out position, in which the lateral profiles are spaced apart, and a folded-in position, in which the lateral profiles are located adjacent to each other. The folding body enables the user to easily fold the rollator-trolley, without needing to bend the waist, which can be burdensome task for the user. In the folded-in position, the lateral profiles are located adjacent to each other, and the frame is still supported by the wheels of the assembly, resulting in easy storage while the assembly can still roll on its wheels.

In another embodiment, the folding body may comprise at least two crosswise arranged and pivotally interconnected rod elements providing easy folding and extra stability when the assembly is unfolded.

In another embodiment, the rollator-trolley assembly may further comprise a locking mechanism located on the frame for locking the folding body in the folded-out position.

In a further advantageous embodiment the locking mechanism can lock the folding body in an intermediate position, between the folded-in and the folded-out position of the rollator-trolley assembly.

In another embodiment, the release mechanism may comprise a release unit and a locking element, wherein the release mechanism is adjustable between an unlocked position, in which folding of the assembly is allowed, and a locked position, in which folding of the assembly is blocked by a locking element.

In a further advantageous embodiment the bracket shaped handle may be provided with at least one hinge, so that the handle is adjustable between a folded-in and a folded-out position of the assembly. The foldable handle allows more easy folding operation of the device. The handle can remain on the frame when folding.

In another embodiment, the handle may further be adjustable in an intermediate position between a rollator position and a trolley position. The rollator-trolley assembly is utilized as a physical aid device by the user by means of the handle, configurable in a position of preference between a rollator position and a trolley position of the handle, making the device more ergonomically manageable by the user.

In another preferred embodiment, the handle may be height adjustable in a particular user-defined position or height using a height adjustment mechanism located on the frame. The height of the handle with respect to the frame is significant for the user's comfort, operating safety and maneuverability of the device. For instance, the stature of the user plays an important role to enable operating the device ergonomically. The height of the handle with respect to the frame can be adjusted to allow the user to keep the arms low and the elbows close to the body while using the rollator-trolley. In relation to the user's anatomy and physiological characteristics, the height of the handle can be adjusted to improve the user experience, safety and support when using the device.

Advantageously, the height adjustment mechanism may be provided with a memory function which returns the handle to the preset height, after height adjustment of the handle. The preset height of the handle needs to be set manually, preferably once only, however this setting can be changed later on, when for instance the assembly is used by somebody else with other needs and/or preferences. By way of the memory function of the handle, the user does not need to adjust the height when adjusting the rollator-trolley from a folded-in position to a folded-out position, because the handle will automatically be adjusted to the user-defined preset height when the rollator-trolley is folded-out by the user. The height of the handle may, for example, be manually adjusted when folding-in the rollator-trolley, to reduce the overall size of the assembly in this position. A reduced overall size of the assembly in the folded-in position is beneficial when putting away or storing the assembly.

In a further embodiment, the assembly is only foldable when the height of the handle is adjusted to a specific height, preferably the lowest height to reduce the overall size of the assembly.

In another embodiment, the frame may be provided with a brake system arranged on the bracket shaped handle to brake in a controlled manner at least one of the wheels. The brake system provides more user control over the device.

In another embodiment, preferably by means of the brake system, the assembly can be set in a park position, in which at least one of the wheels is blocked. In the park position the assembly can be more stable, making it easier for the user to perform folding of the assembly. Also when leaning on the device the brake system in the park position will prevent the device from rolling away. The park position is also particularly interesting when the user is for example filling the container with goods, exchanging the container, adjusting the height of the handle, pivotally adjusting the handle, etc.

Advantageously, the rollator-trolley may include a seat, arranged between the lateral profiles, for use when the need arises, e.g. when the user is tired, and may want to rest. When the seat is used by the user, more stability of the assembly is obtained when the assembly is set in the park position by means of the brake system.

The seat is preferably flexible, so that when the assembly is folded-in the seat also is folded. The seat may further comprise at least one strap, preferably arranged substantially centrally on the seat, for simplifying folding-in of the assembly. When the release mechanism is unlocked for adjustment of the assembly between the folded-out and folded-in position, the user can facilitate the folding-in action by simply pulling the strap on the seat upward.

The invention further relates to a method for folding a rollator-trolley assembly. The method comprises folding of the rollator-trolley assembly by unlocking the assembly from the locked state, in which the folding of the assembly is blocked, to the unlocked state, in which the folding of the assembly is unblocked, thereafter folding the assembly whereby the lateral frame sides are moved towards each other, until the lateral frame sides are located adjacent to each other.

Further advantageous embodiments are represented in the subclaims.

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 3 (a, b) shows a perspective view of a user handling an embodiment of a rollator-trolley assembly of FIG. 1 with the handle pivotally adjusted in respectively a trolley position and a rollator position;

FIG. 7 (a, b, c) shows perspective views of the frame of the rollator-trolley assembly of FIG. 6 in respectively a folded-out position, an intermediate position between the folded-out and the folded-in position, and a folded-in position;

FIG. 16 shows a perspective view of another exemplary embodiment of a rollator-trolley assembly comprising a container;

FIG. 18 (*a, b*) shows a schematic perspective view and a front view of another embodiment of a rollator-trolley assembly, wherein the front wheels are arranged near each other;

In the figures, the same or corresponding parts are designated with the same reference numerals.

Figure 1:
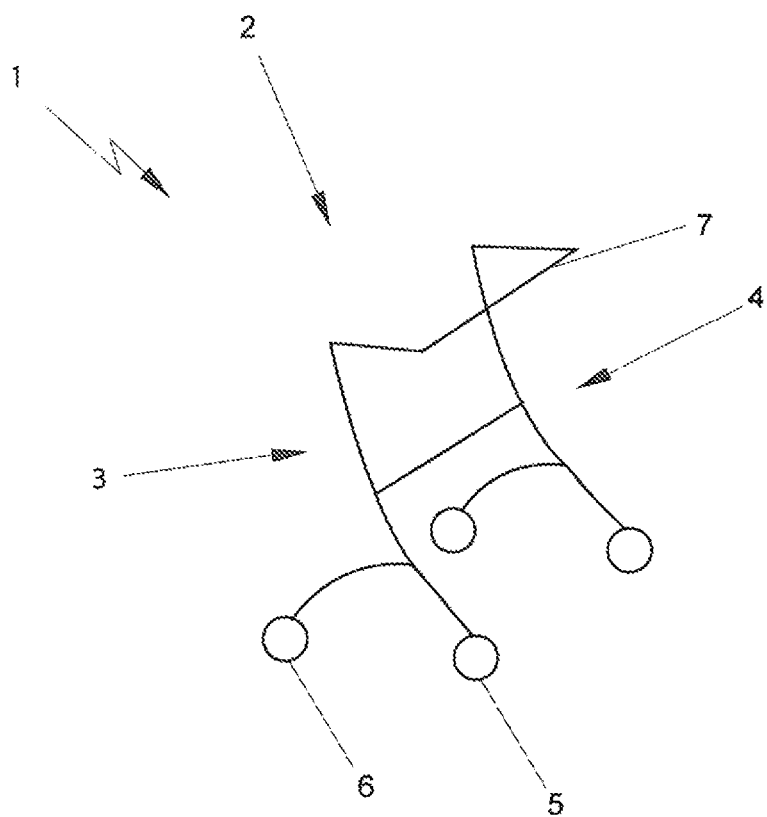
FIG. 1 shows a schematic perspective view of an exemplary embodiment of a rollator-trolley assembly according to the invention.

FIG. 1 shows a perspective view of an exemplary embodiment of a rollator-trolley assembly 1. The rollator-trolley assembly comprises a frame 2 including two spaced apart interconnected lateral frame sides 3 and 4. At a bottom side of each lateral frame side 3 and 4, at least one front wheel 5 and at least one rear 6 wheel is provided. The frame 2 further comprises a handle 7 at a rear upper side of the frame 2 continuously arranged between the two lateral frame sides 3 and 4.

The bracket shaped handle 7 is pivotally adjustable between a rollator position, in which the bracket shaped handle 7 is substantially directed to a front side of the assembly 1, and a trolley position, in which the bracket shaped handle 7 is substantially directed towards a rear side of the assembly 1. A transverse distance between the at least two lateral frame sides 3 and 4 provides a free walking space between the at least two rear wheels 6 in a rollator position. The handle 7 is here embodied as a bracket shaped handle, but can alternatively be embodied as for example two handle parts, one handle part per frame side, wherein the handle 7 is adjustable between the rollator position and the trolley position, either by pivoting or by other ways of adjusting.

The flanks of the rollator-trolley assembly 1 are formed by the lateral frame sides 3 and 4. Each lateral frame side comprises, a first lateral profile to which the rear wheel is mountable, and a second lateral profile to which the front wheel is mountable. The front wheels 5 are to a greater extend in proximity to the front side of the rollator-trolley assembly 1, while the rear wheels 6 are to a greater extend in proximity to the rear side of the rollator-trolley assembly 1. During use of the rollator-trolley assembly 1, the wheels are in contact with the supporting surface, such as e.g. a floor. The wheels 5 and 6 enable efficient movement of the rollator-trolley assembly 1 across the supporting surface by the user.

The user can walk behind the rollator-trolley assembly 1 and grip the bracket shaped handle 7 from the rear side.

In the shown embodiments in the drawing, each lateral frame side comprises at least one profile. In the embodiment shown in FIG. 1, the lateral frame sides 3 and 4 comprise two profiles which are connected to each other. A profile is a structural component designed to carry and support the static and dynamic loads, the forces may include its weight and that of its contents, and other external applied forces. Typically the length of the profile is relatively long compared with its cross-sectional dimensions.

The bracket shaped handle 7 is arranged for use as a user-assembly interface, which handles the user-assembly interaction. The user can operate the rollator-trolley assembly 1 at will by exerting forces to the bracket shaped handle 7, causing movement of the rollator-trolley assembly 1 by the wheels 5 and 6. The user can also use the bracket shaped handle 7 to find support, during both movement and standstill condition of the rollator-trolley assembly 1.

A pivoting element, for example a pivot, hinge, ball and socket joint or other means for pivoting, is used to adjustably pivot the bracket shaped handle 7 between a rollator position and a trolley position.

In the exemplary embodiments lateral frame sides 3 and 4 are arranged substantially similar in shape and the assembly 1 is substantially symmetrical with respect to a longitudinal median plane, which may contribute to improved stability and maneuverability of the rollator-trolley assembly 1 because of the substantially uniform mass distribution. The stiffness of the lateral frame sides 3 and 4 will be substantially equivalent, because of the similarity of the lateral frame sides 3 and 4 of the frame 2.

Figure 2A:
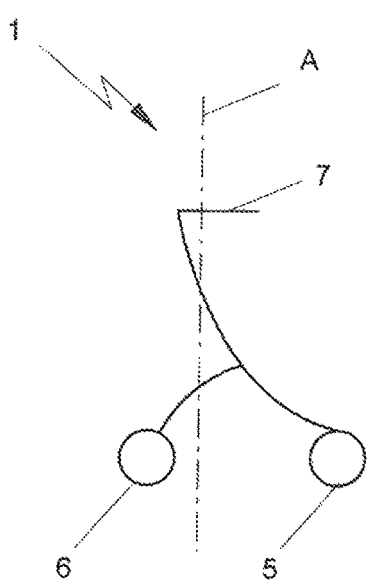
FIG. 2 (a, b) shows a side view and a front view of the rollator-trolley assembly of FIG. 1.
Figure 2B:
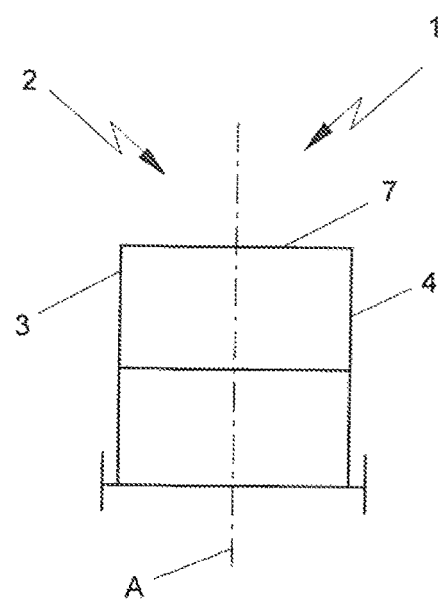

FIGS. 2*a* and 2*b* show respectively a side view and a front view of the rollator-trolley assembly 1, wherein the bracket shaped handle 7 is adjusted to a rollator position.

In FIG. 2*b*, the surfaces formed by the lateral frame sides 3 and 4 of the frame 2 are shown to be substantially planar or flat, and also substantially parallel relative to each other. However, said surfaces formed by the lateral frame sides 3 and 4, can be non-planar and/or non-parallel relative to each other. Sufficient space is provided between the lateral frame sides 3 and 4 to enable the user to walk between the at least two rear wheels 6 in a rollator position of the bracket shaped handle 7. The standing position of the person using the rollator-trolley assembly 1 is indicated by a dash-dot line A.

FIG. 3 shows a user 30 holding a rollator-trolley assembly 1 with the bracket shaped handle 7 pivotally adjusted in respectively a trolley position and a rollator position. The standing position of the person using the rollator-trolley assembly 1 is indicated by a line A. The relative position of the user with respect to the rollator-trolley assembly may change when the bracket shaped handle 7 is pivotally adjusted. However, also the handling of the bracket shaped handle 7 with the hands may change depending on the configuration of said handle in a rollator position, a trolley position, or an intermediate position between a rollator position and a trolley position. As shown in FIG. 3*a*, the user 30 preferably holds the bracket shaped handle 7 at a transverse part substantially parallel to a direction transverse to the lateral frame sides 3 and 4 when the device is configured in a trolley position, which results in easier handling and more maneuverability of the device. As shown in FIG. 3*b*, the user 30 preferably holds the bracket shaped handle 7 at a lateral part substantially parallel to the lateral frame sides 3 and 4 when the device is configured in a rollator position, which may be more convenient since the user 30 is standing at least partially between the rear wheels 6 of the rollator-trolley assembly 1. Therefore, advantageously the bracket shaped handle 7 may comprise handgrips arranged on both the lateral parts substantially parallel to the lateral frame sides 3 and 4 preferably used in the rollator configuration of the device, and on the transverse part substantially parallel to a direction transverse to the lateral frame sides 3 and 4 preferably used in the trolley configuration of the device.

FIGS. 3a, 3b show perspective views of the bracket shaped handle 7 pivotally adjusted in a rollator position and a trolley position, respectively. The front side and the rear side of the rollator-trolley assembly are also indicated. Two lines V, each going vertically through one of the pivot points of the bracket shaped handle 7 around an axis transverse to the lateral frame sides 3 and 4, define an angle α with respect to the central axis longitudinally through the lateral parts of the bracket shaped handle 7. In a trolley position, the bracket shaped handle is substantially directed to a rear side of the rollator-trolley assembly 1, defining a negative angle α, as shown in FIG. 3a. In a rollator position, the bracket shaped handle 7 is substantially directed to a front side of the rollator-trolley assembly 1, defining a positive angle α, as shown in FIG. 3b. Therefore, the angle α, which can have positive or negative angular values according to the used convention, represents the pivotal configuration of the bracket shaped handle 7 relative to the frame 2. According to the used convention, a positive angle α means that the bracket shaped handle 7 is substantially directed to a front side of the rollator-trolley assembly 1, i.e. a rollator position, while a negative α means that the bracket shaped handle 7 is substantially directed to the rear side of the rollator-trolley assembly 1, i.e. a trolley position. For example, when α is equal to 90°, the bracket shaped handle 7 is pivotally adjusted to be horizontally directed to a front side of the rollator-trolley assembly 1. When, for example, α is equal to −120°, the bracket shaped handle 7 is pivotally adjusted to be non-horizontally directed to a rear side of the rollator-trolley assembly 1.

In the shown embodiments of the rollator-trolley assembly 1 in FIGS. 1-3, the bracket shaped handle 7 in both the rollator position and the trolley position is substantially orientated in a horizontal fashion. However, the bracket shaped handle 7 can have a non-horizontal orientation in a rollator position and a trolley position. In a particular case, an intermediate position of the bracket shaped handle 7 may be interpreted as a trolley position or a rollator position, depending on the direction in which the bracket shaped handle 7 is pointed relative to the rollator-trolley assembly 1, that is the sign of the angle α according to the used convention shown in FIG. 3.

In FIG. 4 an exemplary embodiment of the rollator-trolley assembly 1 is shown wherein the bracket shaped handle 7 is pivotally arranged around an axis transverse to the lateral frame sides 3 and 4. FIG. 4a shows the rollator-trolley assembly 1 with the bracket shaped handle 7 adjusted to a rollator position, in which the bracket shaped handle is substantially directed to the front side of the rollator-trolley assembly 1. In a rollator position of the bracket shaped handle 7, free user walking space is provided between the rear wheels 6. The bracket shaped handle 7 is further pivotally adjustable in an intermediate position between a rollator position and a trolley position. FIG. 4b, 4c show respectively two intermediate positions of the bracket shaped handle 7, between a rollator position and a trolley position. In FIG. 4c, the bracket shaped handle 7 is adjusted to a trolley position, in which the bracket shaped handle 7 is substantially directed to the rear side of the rollator-trolley assembly 1. Adjustment of the position of the bracket shaped handle 7 in an intermediate position, between a rollator position and a trolley position, can change the height of the gripping part of the bracket shaped handle 7 relative to the rollator-trolley assembly 1. In a trolley position, shown in FIG. 4c, the user stands further away from the rollator-trolley assembly 1 because the bracket shaped handle 7 is directed to a rear side of the rollator-trolley assembly 1, by which the user may no longer walk between the rear wheels 6 of the rollator-trolley assembly 1. The standing position of the person using the rollator-trolley assembly 1 for the different positions of the bracket shaped handle 7 is indicated by a dash-dot line A. The front and rear direction of the rollator-trolley assemblies in FIG. 4 are indicated. The angle α of the bracket shaped handle 7 with respect to the vertical line V going through a pivot point of the bracket shaped handle 7 around an axis transverse to the lateral frame sides 3 and 4 is also shown. The bracket shaped handle 7 of the rollator-trolley assembly 1 in FIG. 4b is pivotally adjusted to an intermediate position, between a rollator position and a trolley position, wherein, in this case, the bracket shaped handle 7 is being substantially directed to a front side of the rollator-trolley assembly 1. Since the angular value of a is positive in the given intermediate position in FIG. 4b, said intermediate position is also regarded as a rollator position of the bracket shaped handle 7, although different from the rollator position of the bracket shaped handle 7 in FIG. 4a, due to the difference in the angular values of a. Similarly, the bracket shaped handle 7 in FIG. 4c is pivotally adjusted to an intermediate position, wherein, in this case, the bracket shaped handle 7 is being substantially directed to a rear side of the device. Since the angular value of a is negative in the given intermediate position in FIG. 4c, said intermediate position is also regarded as a trolley position of the bracket shaped handle 7, although different from the trolley position of the bracket shaped handle 7 in FIG. 4d, due to the difference in the angular values of a. The bracket shaped handle 7 is used for gripping, steering and/or handling the rollator-trolley assembly 1, therefore managing the user-assembly interaction. Varying forces can be exerted by the user on the bracket shaped handle 7 when using the rollator-trolley assembly 1, for example as a walking aid, a trolley, or the combination of the two. The user exerted forces depend on the bracket shaped handle 7 and also on how and where the user holds or grips the handle 7. The stability of the rollator-trolley assembly 1 is also characterized by the length of the bracket shaped handle 7, which preferably is sufficiently large to provide adequate maneuverability, but small enough to maintain stability and avoid tipping over of the rollator-trolley assembly 1, during normal use. Tipping over of the rollator-trolley assembly 1 can be averted by providing sufficient space between the front wheels 5 and the rear wheels 6.

The user mass, i.e. the body mass of the person using the rollator-trolley assembly, may induce a load on the device. This load is applied by the hands of the user on the handgrip of the bracket shaped handle 7 and can be viewed as a loading force F vertically applied to the rollator-trolley assembly 1. A line H extending from the vertical loading force F gives an indication about the stability of the rollator-trolley assembly 1. A plane segment S, bounded by the contact points of the wheels with the supporting surface, comprises the space between a forward wheel 5 and a rear wheel 6 of the rollator-trolley assembly 1. The plane segment S is shown in FIG. 4 as a line bounded by two distinct contact points in a lateral plane, namely the contact point of the forward wheel 5 and the rear wheel 6 of one of the lateral frame sides 3 or 4 with the supporting surface, respectively. When the line H intersects with the plane segment S, as is the case in FIGS. 4a and 4b, the user can find support by applying a vertical loading force F on the bracket shaped handle 7 without risking to turn over the rollator-trolley assembly 1. When the line H extending from the vertical loading force F does not fall inside the plane segment S, the rollator-trolley assembly 1 can turn over when the user applies a loading force F on the bracket shaped handle 7. This is the case in FIG. 4c, wherein the bracket shaped handle 7 is pivotally adjusted to a trolley position whereby the line H, extending from the vertical loading force F, does not intersect with the plane segment S, or does not fall inside the plane segment S. Therefore, it may be inappropriate in said trolley configuration of the bracket shaped handle 7 to use the rollator-trolley assembly 1 as a walking aid, since in this case limited support capacity is provided by the device, compared to the case wherein the bracket shaped handle 7 is pivotally adjusted to a rollator position.

As shown in FIG. 4, the position and orientation of the loading force F depends on the configuration of the bracket shaped handle with respect to the frame, and can change when the bracket shaped handle 7 is pivotally adjusted. When the bracket shaped handle 7 of the rollator-trolley assembly 1 is pivotally adjusted to a rollator position for use as a walking aid device, the vertical loading force falls on the plane segment S between the forward wheel 5 and the rear wheel 6. The line H extending from the vertical loading force F will preferably fall within the plane segment S bounded by the contact points of the wheels with the supporting surface to provide more stability for the user and prevent the device from turning over during supporting action by the user. The rollator-trolley assembly 1 can be designed so that this is also the case when the device is tilted at specific predetermined angles. Typically, a rollator is subjected to a series of stability tests, which are described in norms, such as for example ISO 11199-2. During a stability test, the rollator may be placed with its wheels on a plane which can be tilted from the horizontal plane. Rolling or sliding of the rollator is prevented during the stability test by means that do not influence the test. During this test, it is determined whether the rollator provides sufficient stability for the user, even when the device is used under a tilt angle. The stability tests are designed to ensure that the user of the walking aid device will have support, even in situations where the rollator might be tilted, for instance when the device is used on a tilted supporting surface. Naturally, these design constraints for the rollator can influence the arrangement of the bracket shaped handle 7 with respect to the frame 2 of the rollator-trolley assembly 1.

Figure 4A:
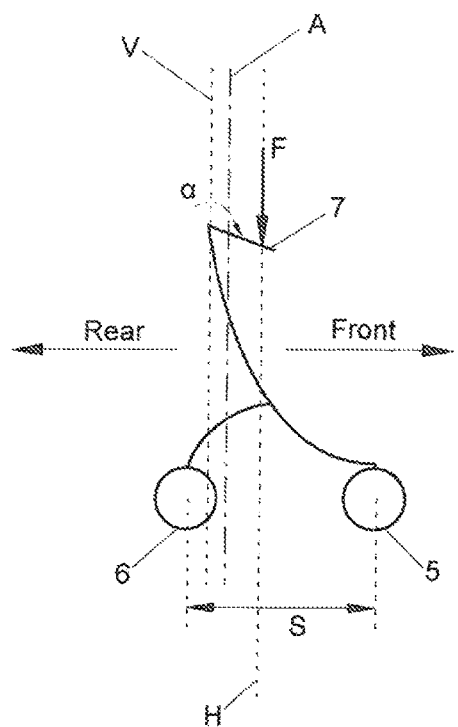
FIG. 4 (a, b, c, d) shows side views of the rollator-trolley assembly of FIG. 1, wherein the handle is adjusted respectively in a rollator position, a trolley position, and two intermediate positions between said rollator position and said trolley position.
Figure 4B:
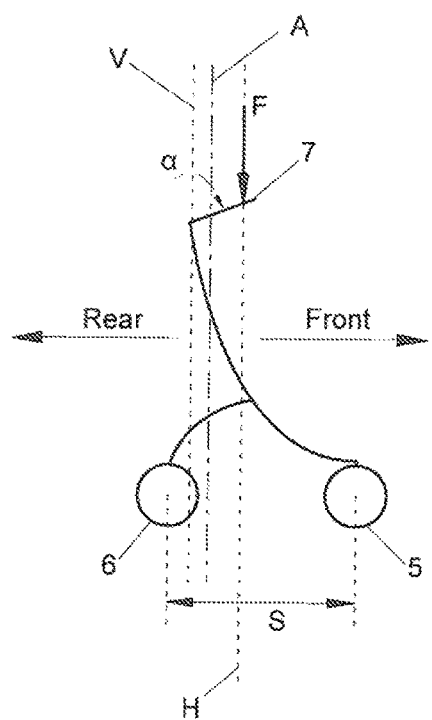
Figure 4C:
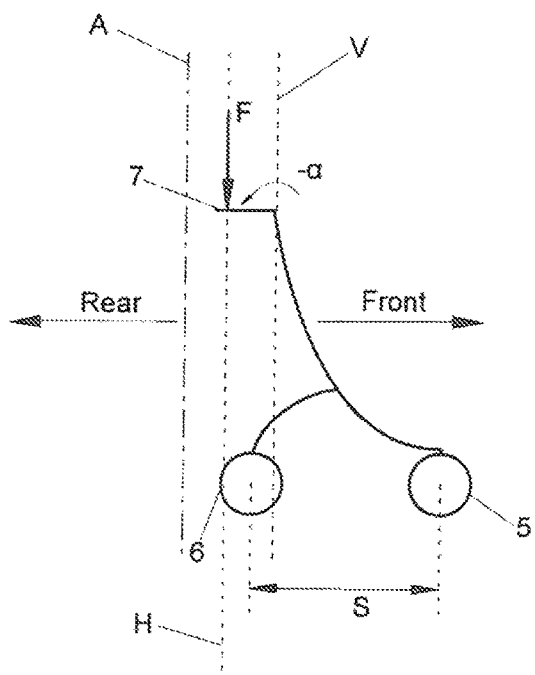
Figure 4D:
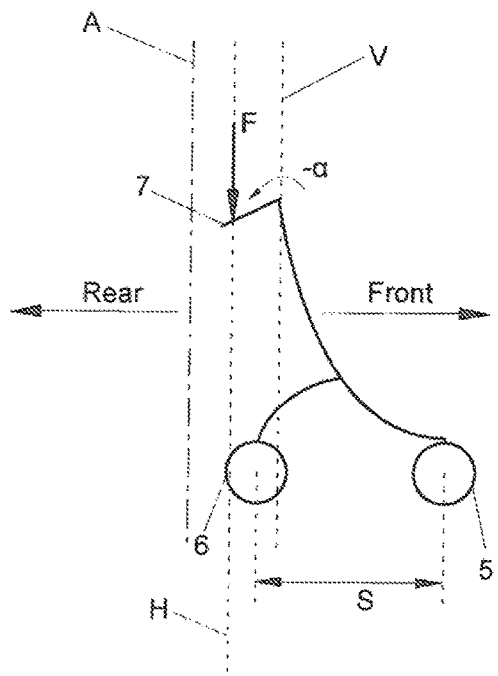

When the bracket shaped handle 7 is pivotally adjusted to a trolley position, as illustrated in FIGS. 4c and 4d, the loading force F will typically fall outside the support plane segment bounded by the contact points of the wheels with the supporting surface. However, the trolley configuration of the device provides the user more maneuverability when operating the device, for instance for evading obstacles on the path, because the user can turn and tilt the device more easily.

In a further advantageous embodiment, the length of the bracket shaped handle 7 is adjustable within the limits for maintaining stability and/or functionality of the rollator-trolley assembly 1.

Figure 5B:
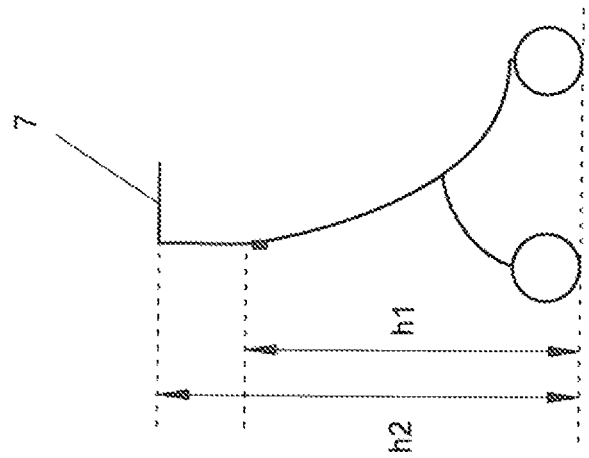
FIG. 5 (a, b) shows a schematic side view of an exemplary embodiment of a rollator trolley assembly comprising a height adjustment mechanism for the handle.
Figure 5A:
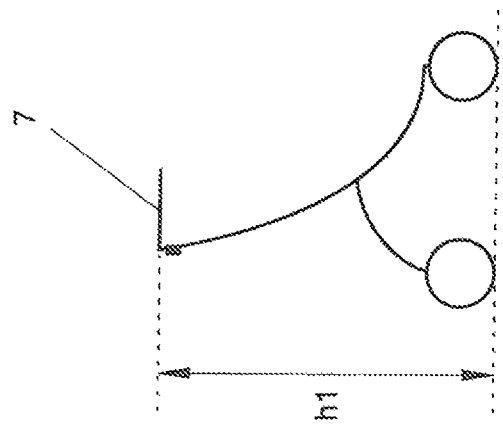

FIG. 5 shows an embodiment of the rollator-trolley assembly 1 further comprising a height adjustment mechanism for adjusting the height of the bracket shaped handle 7 with respect to the frame. Height adjustment of the bracket shaped handle can provide more comfort to the user when operating the rollator-trolley assembly 1. FIG. 5a shows a rollator-trolley assembly 1 with a height h1, with the bracket shaped handle 7 in a rollator position. As shown in FIG. 5b, the height of the rollator-trolley assembly can be increased by height adjustment of the bracket shaped handle 7 to a height h2, with h2>h1.

Advantageously, the height adjustment mechanism for the bracket shaped handle 7 may comprise a memory function for returning the handle 7 to a preset height, after height adjustment of the handle 7. In this way, when the height of the bracket shaped handle 7 is adjusted, for instance when minimizing the height of the rollator-trolley assembly 1 for stowing away the rollator-trolley assembly 1, the memory function can, at a later time, return the bracket shaped handle 7 to the preset user-determined height, so that the user-preferred height does not have to be configured manually. Hence, the user comfort can be increased, making the usage of rollator-trolley assembly 1 more convenient.

In an advantageous embodiment, the height adjustment mechanism for the bracket shaped handle 7 is arranged to keep providing stability for the user when the height is adjusted within the predetermined limits. Therefore, the line H extending from the vertical loading force F should for all possible adjustable heights fall within the plane segment S, during normal use of the rollator-trolley assembly 1, with the bracket shaped handle 7 pivotally adjusted in a rollator position to function as a walking aid for the user.

Figure 6:
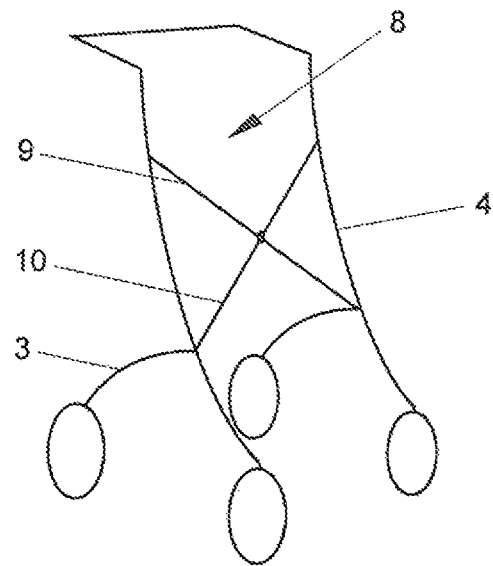
FIG. 6 shows a schematic perspective view of an exemplary embodiment of a rollator-trolley assembly comprising a folding body.

FIG. 6 shows an embodiment of the rollator-trolley assembly 1 further comprising a folding body 8 provided between the lateral frame sides 3 and 4, so that the assembly 1 is adjustable between a folded-out position, in which the lateral frame sides are spaced apart, and a folded-in position, in which the lateral frame sides are located adjacent to each other. The folding body may comprise at least two crosswise arranged and pivotally interconnected rod elements. As shown in the embodiment in FIG. 6, the folding body 8 comprises two crosswise arranged pivotally interconnected rod elements 9 and 10 arranged between the lateral profile sides 3 and 4.

In an alternative embodiment the folding body 8 may comprise a telescoping arm interconnecting the two lateral frame sides 3 and 4. The space between the lateral frame sides 3 and 4 can be adjusted by adjustment of the length of the telescoping arm.

The rollator-trolley assembly 1 can further comprise an adjustable locking mechanism for locking the folding body in the folded-out position, to prevent that the rollator-trolley assembly 1 would unwillingly be folded in by the user, for example when maneuvering the device.

In another advantageous embodiment, the adjustable locking mechanism will automatically lock the rollator-trolley assembly 1 in the folded-out position when the rollator-trolley assembly 1 is folded out, after which the adjustable locking mechanism can be unlocked by the user to perform the folding in operation.

In a further advantageous embodiment the adjustable locking mechanism also enables locking of the folding body in a position between the folded-out and the folded-in positions for adjusting the space between the lateral frame sides.

FIG. 7 shows an embodiment of the rollator-trolley assembly 1, comprising a folding body 8 comprising two crosswise arranged and pivotally interconnected rod elements 9 and 10. FIG. 7a shows the rollator-trolley assembly 1 in the folded-out position, in which sufficient walking space is provided between the rear wheels 6 when the bracket shaped handle 7 is adjusted to a rollator position. FIG. 7b shows the rollator-trolley assembly 1 in a position between the folded-out position and the folded-in position. FIG. 7c shows the rollator-trolley assembly 1 in the folded-in position, the lateral frame sides 3 and 4 are adjacent to each other. The bracket shaped handle 7 is not shown in FIGS. 7a-7c, because the handle 7 may be removed when folding the rollator-trolley assembly 1, or alternatively, the handle 7 may be arranged foldable, so that removal of the handle 7 is not required to fold the rollator-trolley assembly 1. When folding the rollator-trolley assembly 1, the lateral frame sides 3 and 4 are moved closer to each other, until said lateral frame sides are adjacent to each other. In the folded-in position, the outer dimensions of the rollator-trolley assembly 1 are decreased, so that said rollator-trolley assembly 1 can be easily stowed away.

Figure 8:
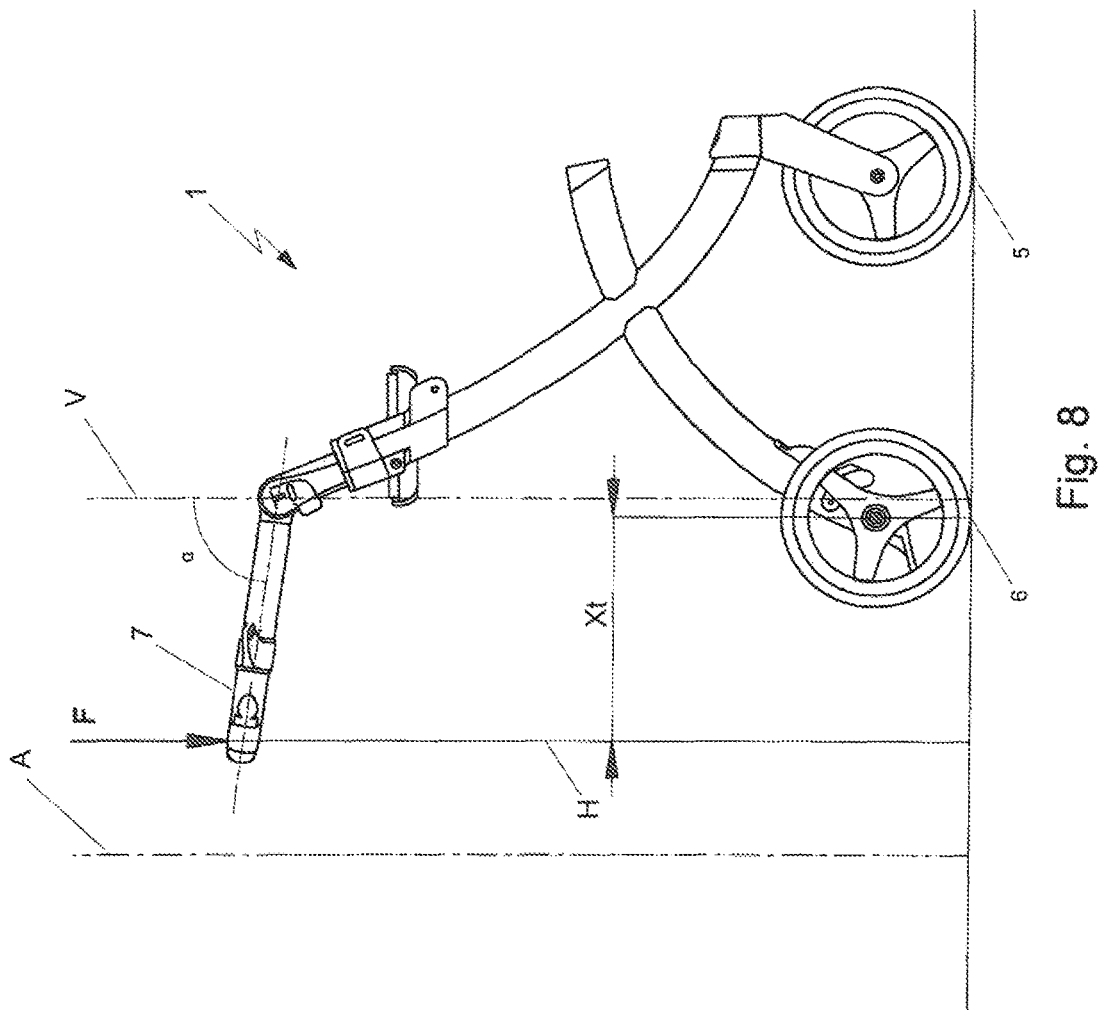
FIG. 8 shows a side view of another exemplary embodiment of a rollator-trolley assembly according to the invention, wherein the handle is adjusted to a trolley position.
Figure 9:
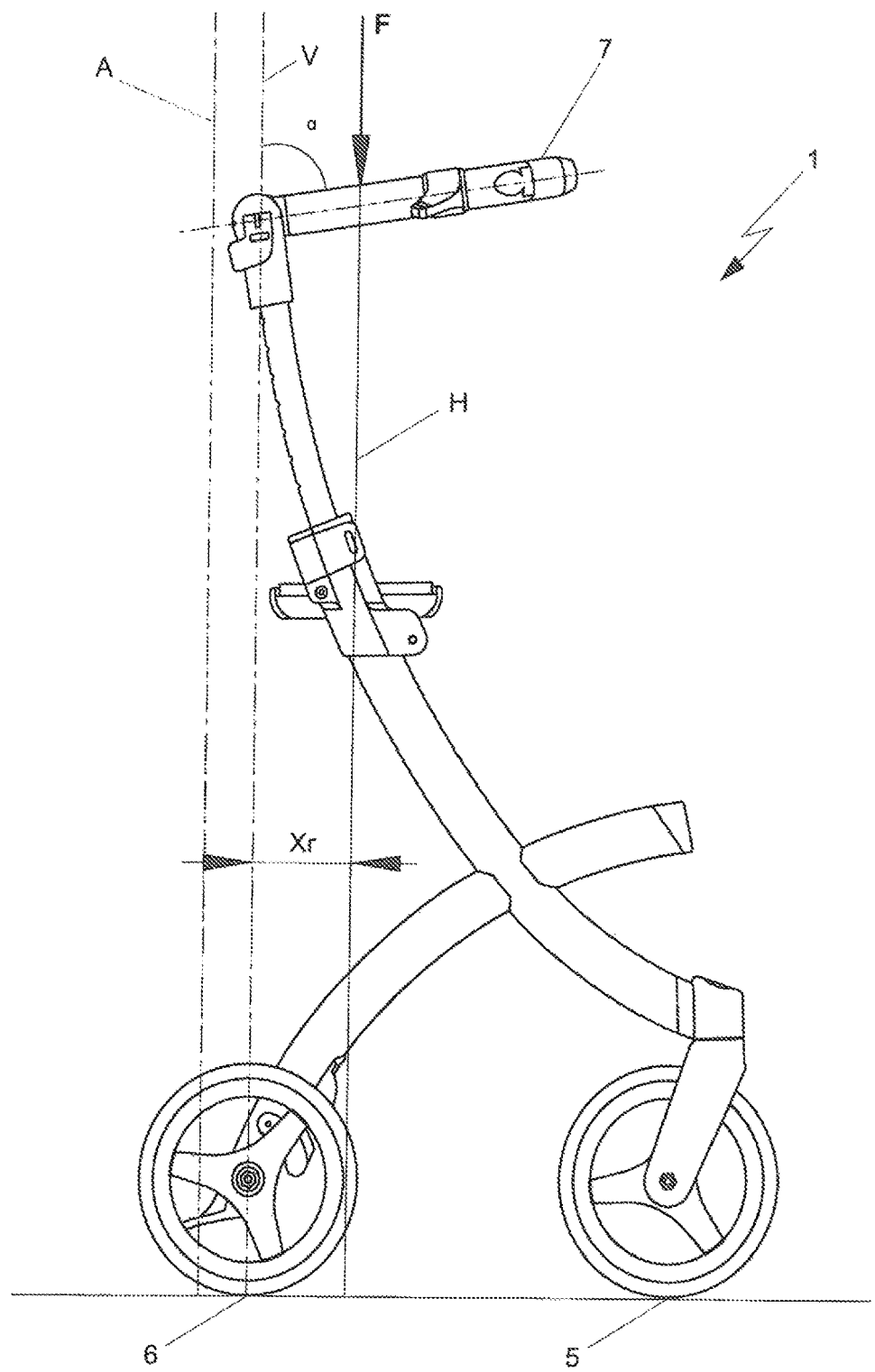
FIG. 9 shows a side view of another exemplary embodiment of a rollator-trolley assembly, wherein the handle is adjusted to a rollator position.

FIGS. 8-9 show a side view of another embodiment of the rollator trolley assembly 1 according to an aspect of the invention. FIG. 8 shows the bracket shaped handle 7 pivotally adjusted to a trolley position, thus said handle 7 substantially directed to a rear side of the rollator-trolley assembly 1. FIG. 9 shows the bracket shaped handle 7 adjusted to a rollator position, said handle substantially directed to a front side of the rollator-trolley assembly 1. As shown in FIGS. 8-9, the rollator-trolley assembly 1 can be set in the rollator position or the trolley position, without necessarily having a horizontal orientation of the lateral part of the bracket shaped handle 7. The standing position of the person using the rollator-trolley assembly 1 is indicated by a dash-dot line A. The horizontal distance from the vertical line going through the center of a rear wheel 6 of the rollator-trolley assembly 1, to the vertical line H extending from the vertical loading force F on the bracket shaped handle 7, is defined by Xt when the bracket shaped handle 7 is pivotally adjusted to a trolley position, and Xr when the bracket shaped handle is pivotally adjusted to a rollator position. Since the distance is determined from the vertical line going through the center of a rear wheel 6, typically Xt has an opposite sign with respect to Xr because the vertical line H, which extends from the vertical loading force F, goes through the space between the wheels of the rollator-trolley assembly 1 when the bracket shaped handle 7 is pivotally adjusted in a rollator position (FIG. 9), while this is not the case when the bracket shaped handle 7 is pivotally adjusted in a trolley position (FIG. 8).

Figure 10A:
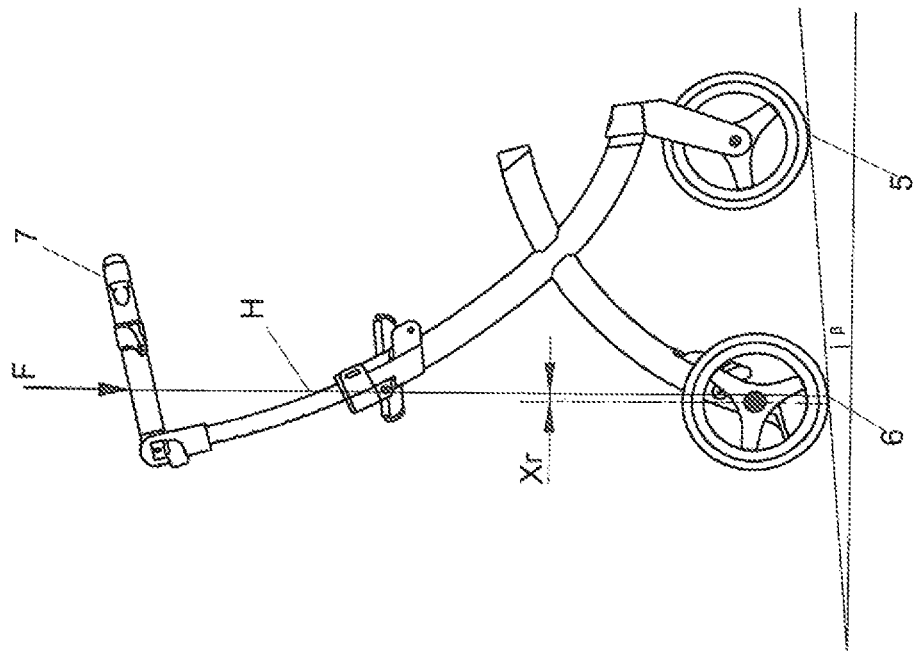
FIG. 10 (a, b) shows a side view of an exemplary embodiment of a rollator-trolley assembly, wherein the handle is adjusted to a rollator position to illustrate the vertical loading force in a horizontal and a non-horizontal, or tilted, state of the rollator-trolley assembly.
Figure 10B:
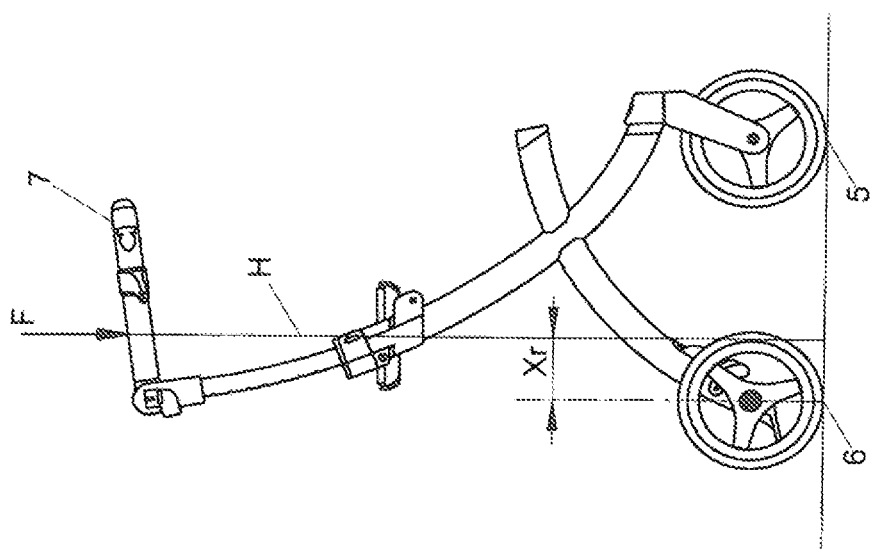

FIG. 10 shows an advantageous embodiment of the rollator-trolley assembly 1, wherein the change of the horizontal distance, from the vertical line going through the center of a rear wheel 6, to the vertical line H extending from the vertical loading force F on the bracket shaped handle 7 which is pivotally adjusted in a rollator position, is illustrated for a rollator-trolley assembly 1 placed on a horizontal plane, and a plane which is tilted with a tilt angle ß from horizontal plane. The rollator-trolley assembly 1 may be arranged so that Xr>0 remains valid according to the used convention for the tilt angle ß. The distance Xr and tilt angle ß can be described in norms to ensure stability when the device is used as a rollator on non-horizontal supporting surfaces. For example, in ISO 11199-2, the forward, backward and sideway stability test is described, wherein the tilt angle ß must not be smaller than 15°, 7° and 3.5°, respectively. In the forward stability test the front wheels of the rollator are lower than the rear wheels, relative to the tilted horizontal plane.

Figure 11B:
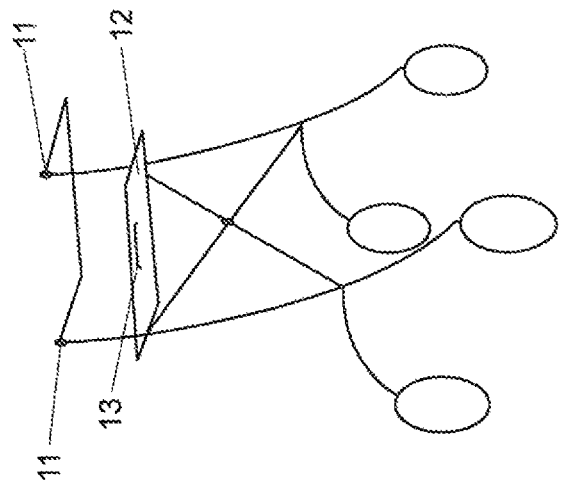
FIG. 11 (a, b) shows perspective views of another exemplary embodiment of a rollator-trolley assembly, wherein the handle is adjusted from an intermediate position to a trolley position.
Figure 11A:
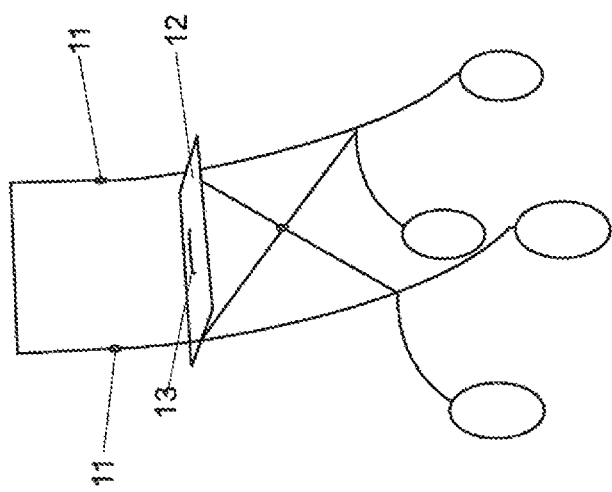

FIG. 11 shows another advantageous embodiment of the rollator-trolley assembly 1. On each side of the bracket shaped handle 7, a latch 11 arranged for fastening and unfastening the bracket shaped handle 7 is provided at the pivot point, to enable pivotal adjustment of the bracket shaped handle 7 to a rollator position, a trolley position, or an intermediate position between the rollator position and the trolley position. The bracket shaped handle 7 can be unfastened by operating the latch 11, so as to enable pivoting of the bracket shaped handle 7 for adjustment to a user-desired position. The adjustment of the position of the bracket shaped handle 7 may be arranged continuously or discontinuously, wherein the discontinuous case includes the arrangement of a plurality of predetermined intermediate positions between a rollator position and a trolley position in which the bracket shaped handle 7 can be set and/or locked by the user. The bracket shaped handle 7 can be automatically locked or fixed in a desired position when releasing the push buttons 11. The rollator-trolley assembly 1 may further include seat 12 supported by the rollator-trolley assembly 1. In an advantageous embodiment, the seat 12 is foldable and/or removable arranged between the two lateral profile sides 3 and 4. In FIG. 11, the seat 12 is flexible, so that during folding in of the rollator-trolley assembly 1, wherein the space between the lateral frame sides 3 and 4 is reduced, the seat is compliantly folded. The flexible seat 12 can also serve as a means for making the folding in operation more convenient for the user. A strap 13 can be arranged substantially centrally on the seat 12. By pulling the strap 13 upward, the lateral frame sides 3 and 4 are conveniently pulled towards each other, so that the rollator-trolley assembly 1 can be folded.

Figure 12A:
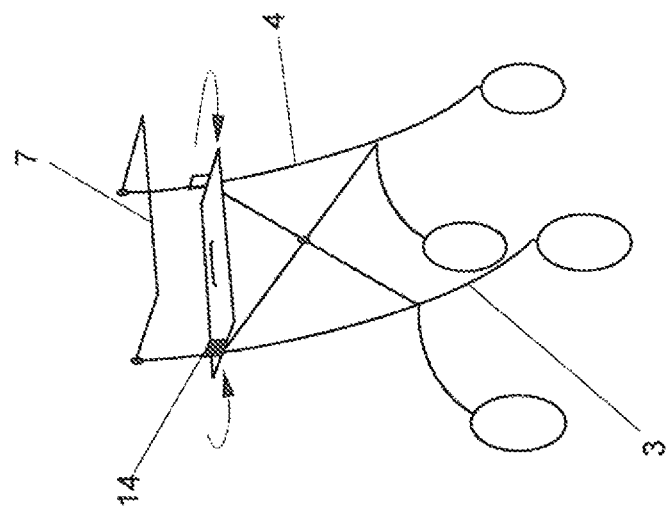
FIG. 12 (a, b) shows perspective views of a height adjustment mechanism of another exemplary embodiment of the rollator-trolley assembly.
Figure 12B:
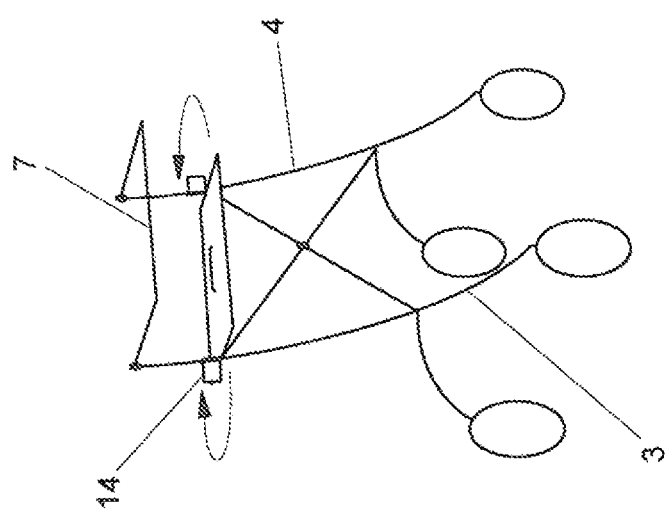

FIG. 12 shows an embodiment of the rollator-trolley assembly 1 comprising a height adjustment mechanism for adjusting the height of the bracket shaped handle 7 with respect to the frame 2. The height adjustment mechanism can be unlocked by releasing the lock bars 14 provided on the lateral frame sides 3 and 4, as shown in FIG. 12a. In this unlocked state of the height adjustment mechanism, the bracket shaped handle 7 can be moved upwards, increasing the total height of the rollator-trolley assembly 1, or conversely, moved downwards, decreasing the total height of the rollator-trolley assembly 1. The bracket shaped handle 7 can be locked in a user-desired height by use of the lock bars 14. The bracket shaped handle 7 comprises profile ends 15 arranged for connection to profiles of the lateral profile sides 3 and 4 at a rear upper side of the frame 2 of the rollator-trolley assembly 1. When the height adjustment mechanism is enabled and the lock bars 14 are unlocked, the profile ends 15 can slide inside the profiles of the lateral profile sides 3 and 4. By closing the lock bars 14 sliding of the profile ends 15 of the bracket shaped handle 7 is blocked, so that the height of the handle 7 is set.

Figure 13B:
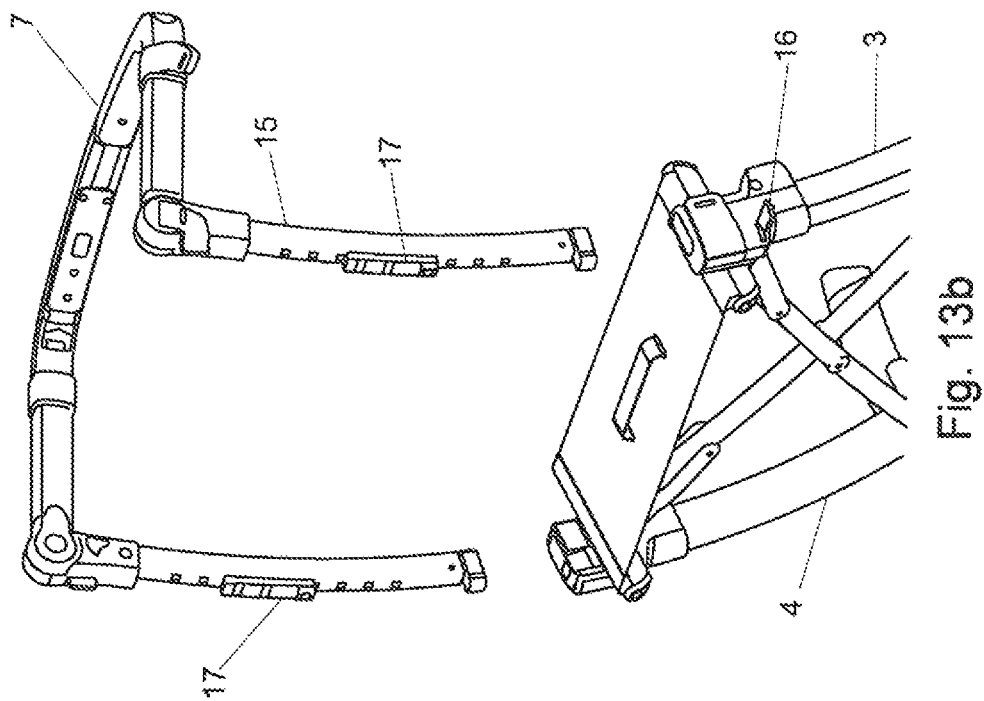
FIG. 13 (a, b) shows perspective views of the memory function of the height adjustment mechanism of the handle of another exemplary embodiment of a rollator-trolley assembly.
Figure 13A:
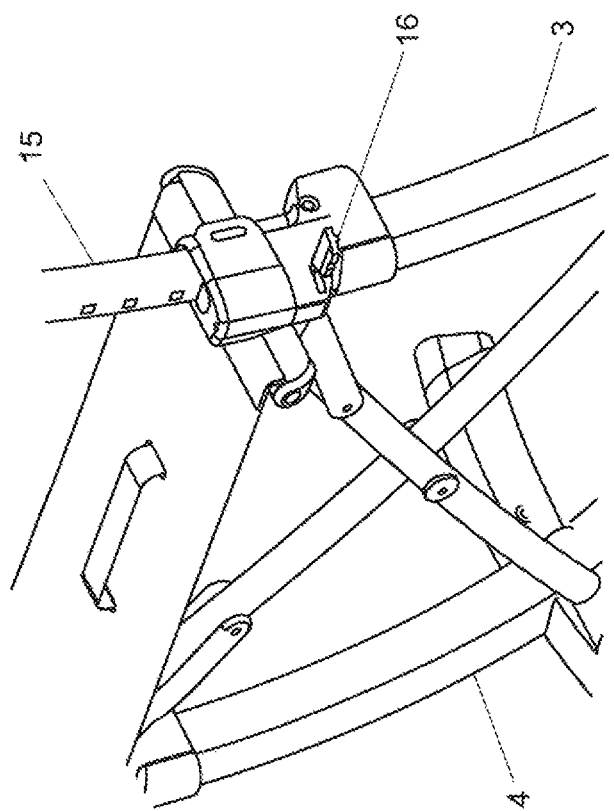

As shown in the exemplary embodiment of FIG. 13, the height adjustment mechanism may comprise a memory function for advantageously returning the bracket shaped handle 7 to a preset height, after manual height adjustment of the bracket shaped handle 7. The preset height is a user-determined preferred personal height, which is preferably set once-only. The preset height can be configured by successively unlocking the height adjustment mechanism of the bracket shaped handle 7 and by doings so uncoupling the bracket shaped handle 7 from the frame 2, then sliding the profile ends 15 of the bracket shaped handle 7 out of the profile of the lateral frame sides 3 and 4, and then changing the height of the height set elements 17 provided on profile ends 15. It is more convenient for the user to find the preset preferred height using the height set elements 17. When adjusting the height of the bracket shaped handle, for example to find the user-preferred height, the bracket shaped handle 7 will automatically fix when the preset height is reached by the height set elements 17. A key 16 may be provided to remove the lock to manually adjust the height set elements 17 to a user-preferred height. Alternatively, the latch 11 at the pivot point of the bracket shaped handle 7 may be operable by push buttons. Pivoting of the bracket shaped handle 7 for adjustment to a user-desired position is enabled by simultaneously pushing said push buttons. Alternative latches or fastening mechanisms for fastening and unfastening the bracket shaped handle 7 at the pivot point, to enable pivotal adjustment of the bracket shaped handle 7, are possible.

Figure 14B:
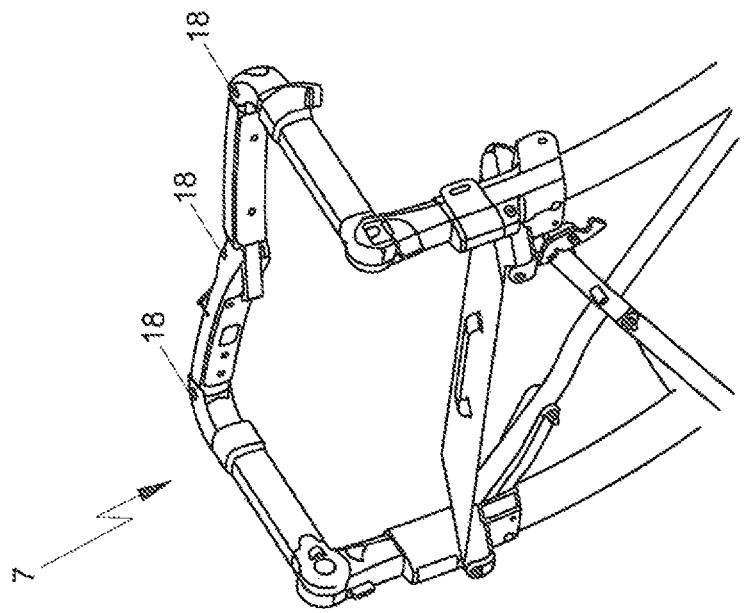
FIG. 14 (a, b) shows perspective views of a foldable bracket shaped handle of another exemplary embodiment of a rollator-trolley assembly.
Figure 14A:
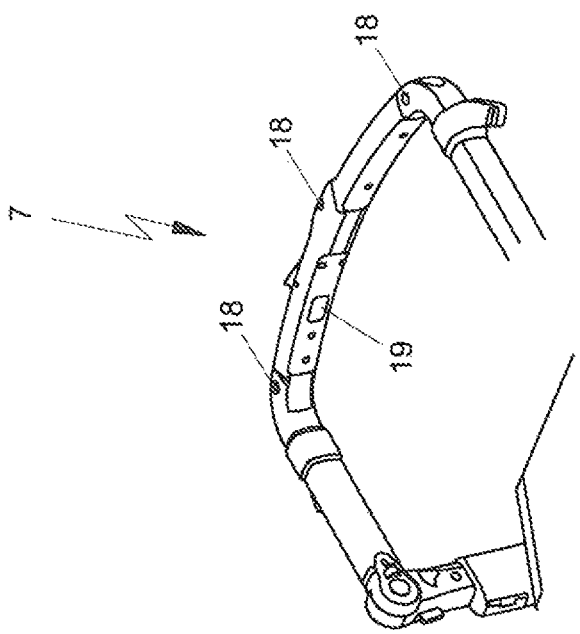

The bracket shaped handle 7 may be provided with at least one hinge, to allow folding of the handle 7. FIG. 14 shows an exemplary embodiment wherein the bracket shaped handle 7 is provided with three hinges 18, to allow folding. The rollator-trolley assembly 1 includes a lock mechanism for blocking at least one of the hinges 18 to prevent folding of the bracket shaped handle 7. The lock mechanism of the bracket shaped handle 7 can be adjusted to a locked state, wherein folding of the bracket shaped handle 7 is blocked, and an unlocked state, wherein folding of the bracket shaped handle 7 is unblocked. By unlocking the lock mechanism of the bracket shaped handle 7, the hinges can pivot, so that the handle 7 can be folded, for instance when the lateral frame sides 3 and 4 are moved towards each other during folding of the rollator-trolley assembly 1. An handle lock arrangement 19 is comprised in the bracket shaped handle 7 to adjust the lock mechanism from a locked state to an unlocked state, and vice versa. In FIG. 13 the handle lock arrangement 19 is provided as a pushbutton.

Figure 15C:
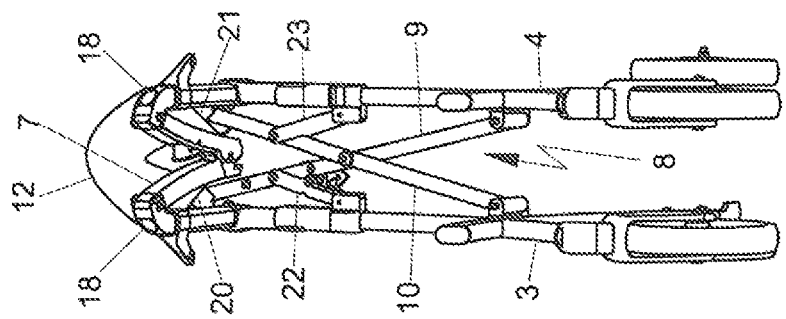
FIG. 15 (*a, b, c*) shows perspective views of another exemplary embodiment of a rollator-trolley assembly in a folded-out position, an intermediate position between the folded-out and the folded-in position, and a folded-in position.
Figure 15B:
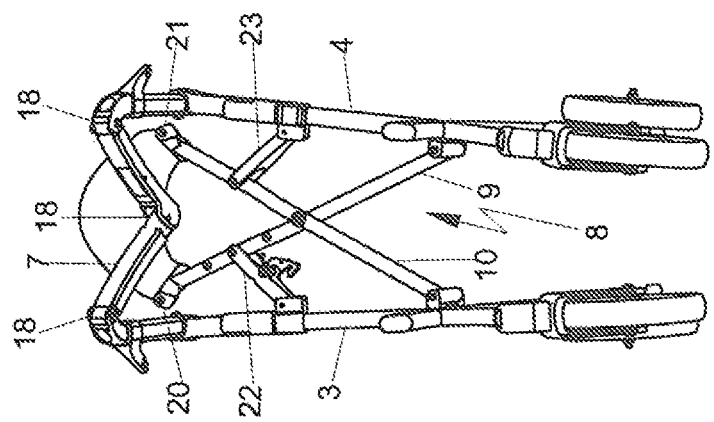
Figure 15A:
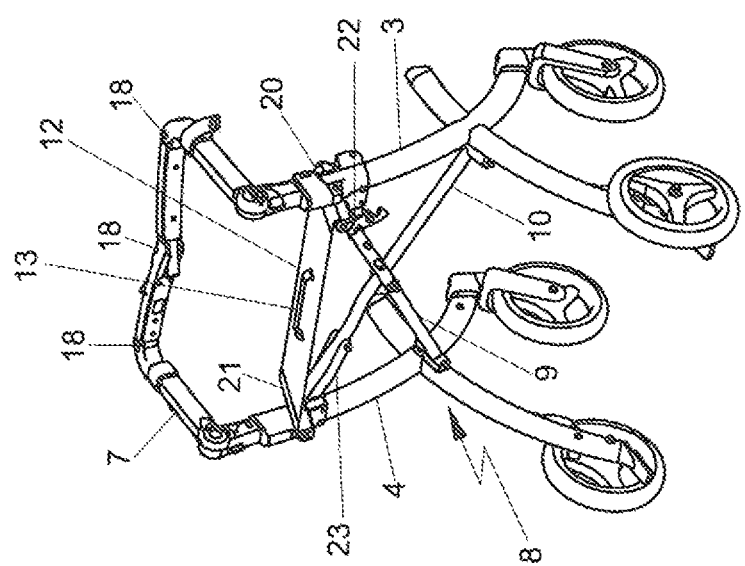

FIG. 15 shows an exemplary embodiment of the rollator-trolley assembly 1 comprising a folding body 8 comprising two crosswise arranged and pivotally interconnected rod elements 9 and 10. Partially pivoting seat holders 21 and 22, for holding the flexible seat 12 comprising a strap 13, are arranged at the upper end of the rod elements 9 and 10. The bottom ends of the rod elements 9 and 10 are pivotally connected to the lateral frame sides 3 and 4. Coupling rods 22 and 23 are respectively pivotally connected to the lateral frame sides 3 and 4, and respectively pivotally connected to the rod elements 9 and 10, at a location between the pivotal interconnection of the rod elements 9 and 10 and the ends of the rod elements 9 and 10 at which the seat holders 21 and 22 are arranged. The coupling rods 22 and 23 provide a coupling of the rod elements 9 and 10 with the lateral frame sides 3 and 4, respectively. When both the folding body 8 and the bracket shaped handle 7 are unlocked, to enable folding, the rollator-trolley assembly 1 can be folded in by moving the lateral frame sides 3 and 4 towards each other. A strap 13 is arranged centrally on the seat 12, enabling more convenient folding operation of the rollator-trolley assembly 1. By pulling the strap upward the lateral frame sides will move towards each other, because the flexible seat is connected to the crosswise bars, which are coupled with both lateral frame sides.

In a further advantageous embodiment, the partially pivoting seat holders 21 and 22 holding the seat 12 are height adjustable with respect to the wheels 5 and 6 of the rollator-trolley assembly 1.

In an advantageous embodiment of the rollator-trolley assembly 1, the frame is provided with a carrying system for carrying a container 24. FIG. 16 shows a rollator-trolley assembly 1 comprising a container 24. The container can be for example a bag for storing goods. An advantageous embodiment of the rollator-trolley assembly 1 may comprise a removable container 24 carried by the container holders arranged on the upper end of the lateral frame sides 3 and 4. The container can be mounted on the rollator-trolley assembly 1 by coupling the mounting parts on the container 24 with the container holders on the frame 2. Advantageously a container strap may be arranged on the top side of the container 24, wherein pulling the container strap in an upward direction automatically uncouples the container 24 from the frame 2, after which the container can be removed entirely from the rollator-trolley assembly 1. Different types of containers can be mounted on the rollator-trolley assembly 1. Also foldable containers can be arranged, when using for example flexible bags, or alternatively, flexible bags comprising hinged support arms. In this way, it is no longer necessary to remove the bag from the rollator-trolley assembly 1 prior to folding.

The container holders can be made releasably attachable, such that it may be affixed to the frame, and then removed as desired, or alternatively, exchanged to enable the mounting of containers with different mounting parts.

The rollator-trolley assembly 1 can be provided with a brake system to brake in a controlled manner at least one of the wheels. The brake system comprises an actuation mechanism to transmit force from the user to a part of the system that does the braking of the wheels. In FIG. 17 the bracket shaped handle 7 comprises a brake lever 28 for operating the brake system by activation of a brake via a brake cable which is preferably housed inside the profiles of the frame 2 and the bracket shaped handle 7. The brake lever 28 may be integrated on the bracket shaped handle within easy reach of the user's hands, and can be different compared to conventional brake levers in the sense that the brake lever 28 is preferably rotatably arranged with an axis of rotation coinciding with a length axis of bracket shaped handle 7 so that it does not require a pulling action. By use of the rotational mechanism of the brake lever 28, no strong pull needs to be applied to the brake actuation mechanism, which is beneficial since pulling a conventional brake lever can be a difficult task for some group of users, for example the elderly.

Figure 17C:
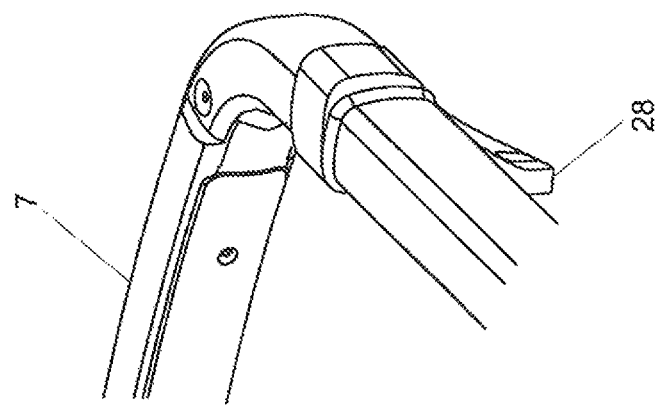
FIG. 17 (*a, b, c*) shows a close-up of the brake lever comprised in the bracket shaped handle of an exemplary embodiment of the rollator-trolley assembly comprising a brake system.
Figure 17B:
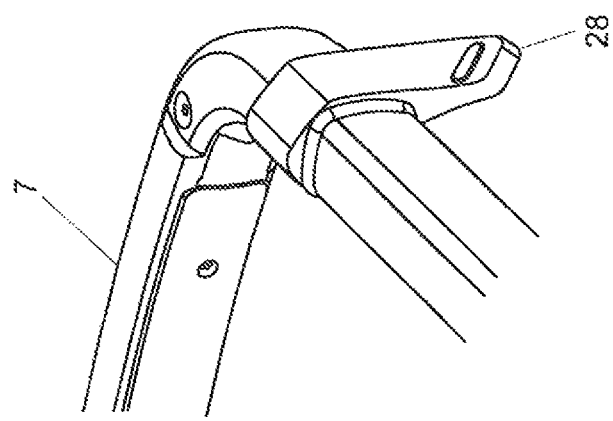
Figure 17A:
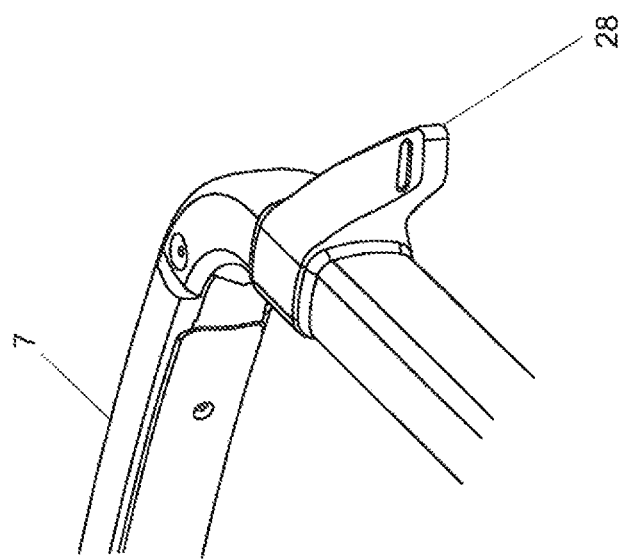

By means of the brake system, the assembly 1 can be set in a park position, in which at least one of the wheels is blocked. FIG. 17a shows the brake lever 28 in the rest position, wherein the brake system is not activated. FIG. 17b shows the brake lever 28 partially turned, wherein the brake system is braking at least one of the wheels in a controlled manner. The resistance provided by the brake system on at least one of the wheels is preferably substantially proportional to the turning position of the brake lever 28. FIG. 17c shows the brake lever 28 turned approximately 90 degrees with respect to the rest position, which corresponds to a park position, wherein the brake system blocks at least one of the wheels.

FIG. 18 shows another embodiment of the rollator-trolley assembly 1 with the planes going through each of the lateral frame sides 3 and 4 being substantially non-flat. The front wheels 5 are arranged relatively close to each other, compared to the rear wheels 6, which are arranged at a larger distance from each other to provide walking space for the user when the bracket-shaped handle 7 is adjusted to a rollator position. The maneuverability of the rollator-trolley assembly 1 may be increased by placing the front wheels close to each other.

Figure 19B:
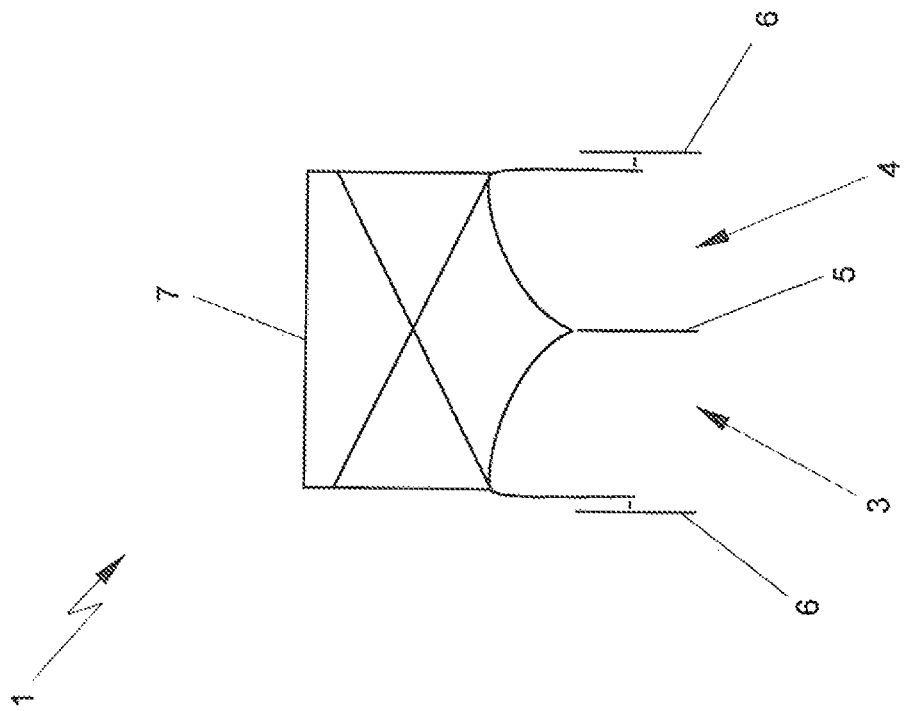
FIG. 19 (*a, b*) shows a schematic perspective view and a front view of another embodiment of a rollator-trolley assembly comprising two rear wheels and a single front wheel.
Figure 19A:
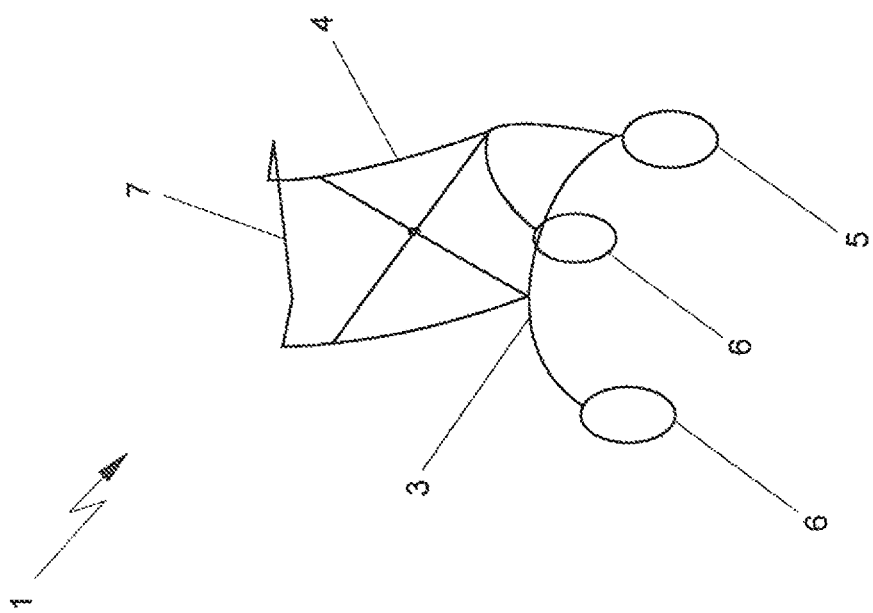

In a further advantageous embodiment as shown in FIG. 19, the at least two front wheels 5 of the rollator-trolley assembly 1 are replaced by a single front wheel 5. In this case, the lateral profile sides 3 and 4 comprise the same front wheel 5.

Figure 20:
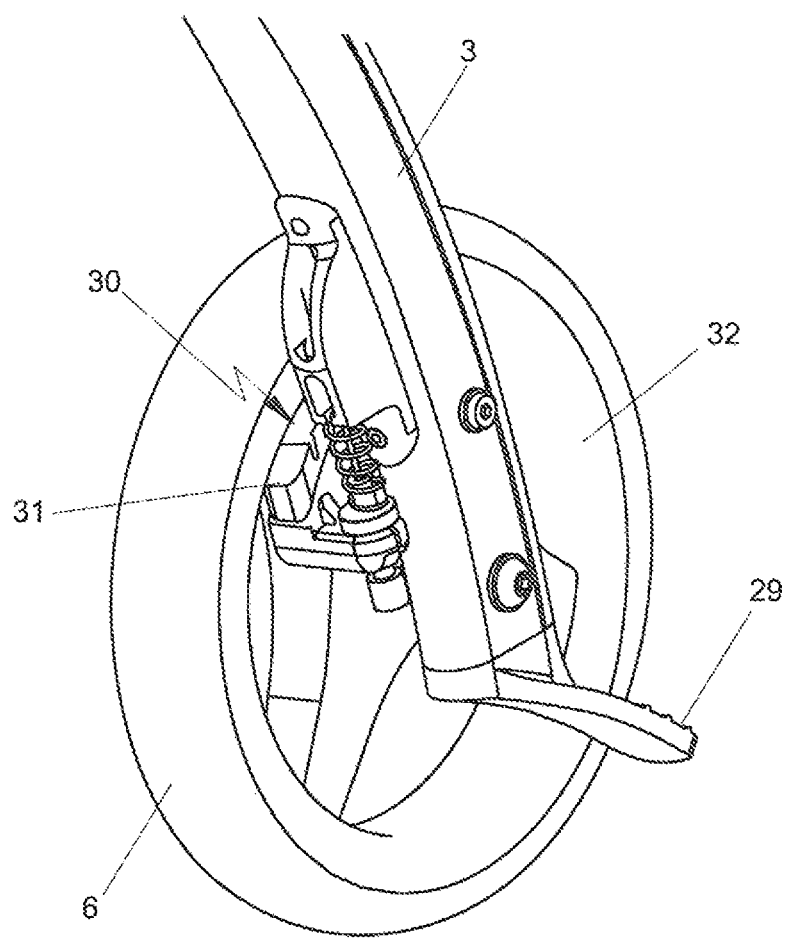
FIG. 20 shows a perspective view of another embodiment of a rollator-trolley assembly comprising a foot lever near a rear wheel, the assembly further comprising a brake system arranged on the rear wheel.

The rear wheels 6 are each connected with a profile of the lateral frame sides 3 and 4. At least one foot lever 29 can be attached to the frame 2, near at least one of the rear wheels 6, to improve maneuverability of the rollator-trolley assembly 1. FIG. 20 shows another advantageous embodiment of the rollator-trolley assembly 1 with a foot lever 29 attached to said profiles, preferably near the rear wheels, and extending rearward relative to the frame 2. The foot lever 29 provides a fixed extension of a profile of the frame 2 and is engageable by a user's foot to provide a lever for facilitating turning over of the rollator-trolley assembly 1 about the center of the rear wheels 6. The user can press upon the foot lever 29, preferably with a foot, and thereby enable lifting up the front wheels 5, for example to evade an obstacle encountered on the path when using the rollator-trolley assembly 1. In the shown embodiment in FIGS. 8-12, 15-16 the front wheels are pivotally arranged to enhance the maneuverability, the rear wheels are non-pivotally arranged without a surrounding wheel fork, and at least partially incorporated in the frame to reduce the total width of the rollator-trolley assembly 1.

FIG. 20 shows a rear wheel further comprising a brake system. The brake system comprises a rim brake assembly 30 for braking at least one of the wheels of the rollator-trolley assembly 1. The rim brake assembly 30 can reduce the speed of the rollator-trolley assembly 1 or prevent it from moving. The rim brake assembly 30 applies the braking force by a friction pad 31 to a rim 32 of at least one wheel 6, thus slowing and/or blocking the wheel and the rollator-trolley assembly 1. In the advantageous embodiment of FIG. 20, the friction pad 31 contacts a rim 31 on an interior circumferential surface of a wheel 6, so that the wear and tear of the wheel can be reduced. In this way, the brake system can also be made more compact, which is advantageous for the design of the rollator-trolley assembly 1. The rim brake system is actuated by the user operating a lever mounted on the bracket shaped handle 7.

Other types of brake systems, such as for example disc brakes, drum brakes, etc. can be arranged on other advantageous embodiments of the rollator-trolley assembly 1.

Biasing elements, such as springs, can be included in the folding body 8 and/or the hinges 18 of the bracket shaped handle 7, so that the rollator-trolley assembly 1 is biased towards a certain position, for example the folding-in position, making the folding-in operation more convenient for the user.

The bracket shaped handle 7 in the embodiments shown in the drawing are substantially U-shaped. However, many variants for the shape of the bracket shaped handle 7 are possible. For example in FIGS. 1-3, the transverse part of the bracket shaped handle 7, i.e. substantially parallel to a direction transverse to the lateral frame sides 3 and 4, is shown to be substantially straight, however, said part of the handle 7 can be non-straight, for example curved, including a plurality of substantially convex and/or concave portions, to enhance the gripping and handling of the bracket shaped handle 7 for the user.

In the shown embodiments of the drawing, the bracket shaped handle 7 is made up of at least one angled portion connecting the transverse part and a lateral part, and is pivotally connected via its lateral part to the two lateral frame sides 3 and 4. It may be formed by a single continuous profile or by hinged parts that interconnect the pivot points or pivots that form the connecting parts between the lateral parts and the lateral frame sides. In the description, the bracket shaped handle's 'direction' is determined by the orientation of the lateral parts in particular relative to the lateral frame sides. The brackets in unfolded form are designed to maintain a distance between said lateral frame sides 3 and 4 of the rollator-trolley assembly 1, thereby providing both support and gripping for the user, and stability for the frame 2.

Generally, a trolley or cart is a wheeled vehicle that can be used for transportation of a load, such as e.g. merchandise. It is usually not well suited for use as a walking aid, because it does not offer a great deal of stability compared to a rollator.

Certain members of most embodiments of the present invention can be made in multiple parts designed for modular assembly of different sizes and shapes and for easy removal and, if necessary replacement of some members or parts of members without disassembly of the entire assembly. The removable parts may include for example the bracket shaped handle 7, profiles of the lateral frame sides 3 and 4, the container 24, the container holders 25, the seat holders 21 and 22, the seat 12 of the rollator-trolley assembly.

For the purpose of clarity and a concise description, features are described herein as part of the same or separate embodiments, however, it will be appreciated that the scope of the invention may include embodiments having combinations of all or some of the features described. Many variants will be apparent to the person skilled in the art.

All variants are understood to be comprised within the scope of the invention defined in the following claims.

The invention claimed is:

1. A rollator-trolley assembly, comprising:
a frame including at least two spaced apart interconnected lateral frame sides,
wherein at a bottom side of each lateral frame side at least one front wheel and at least one rear wheel is provided,
the frame further comprising a handle at a rear upper side of the frame continuously arranged between the two lateral frame sides,
wherein the handle is adjustable between a rollator position, in which the handle is directed to a front side of the assembly, and a trolley position, in which the handle is directed towards a rear side of the assembly;
wherein a transverse distance between the at least two lateral frame sides provides a free walking space between the at least two rear wheels in the rollator position,
wherein the front wheels and the rear wheels define a support plane segment that is bounded by contact points of the front and rear wheels with a supporting surface,
wherein the assembly is configured such that in the rollator position, the user walks inside the free walking space and the support plane segment during use,
wherein each lateral frame side comprises a first lateral profile to which the rear wheel is mountable, and a second lateral profile to which the front wheel is mountable, the assembly further comprising a folding body provided between the second lateral profiles of the lateral frame sides, so that the assembly is adjustable between a folded-out position, in which the lateral frame sides are spaced apart, and a folded-in position, in which the lateral frame sides are located adjacent to each other, wherein the lateral frame sides extend in a longitudinal direction and are within the support plane segment defined by the front and rear wheels in the rollator position, and wherein a vertical loading force provided on the handle in the rollator position falls within the support plane segment.

2. The rollator-trolley assembly according to claim 1, wherein the handle is pivotally arranged around an axis transverse to the lateral frame sides.

3. The rollator-trolley assembly according to claim 1, wherein the lateral frame sides are arranged substantially similar in shape and the assembly is substantially symmetrical with respect to a longitudinal median plane.

4. The rollator-trolley assembly according to claim 1, wherein the frame is provided with a carrying system arranged to carry a container.

5. The rollator-trolley assembly according to claim 1, wherein the folding body comprises at least two crosswise arranged and pivotally interconnected rod elements.

6. The rollator-trolley assembly according to claim 1, further comprising a locking mechanism for locking the folding body in the folded-out position.

7. The rollator-trolley assembly according to claim 1, wherein the handle is provided with at least one hinge, to allow folding of the handle.

8. The rollator-trolley assembly according to claim 1, wherein the handle is further pivotally adjustable in an intermediate position between the rollator position and the trolley position.

9. The rollator-trolley assembly according to claim 1, further comprising a height adjustment mechanism for adjusting the height of the handle with respect to the frame.

10. The rollator-trolley assembly according to claim 1, wherein the frame is provided with a brake system to brake in a controlled manner at least one of the wheels.

11. The rollator-trolley assembly according to claim 10, wherein by means of the brake system, the assembly can be set in a park position, in which at least one of the wheels is blocked.

12. A method for folding a rollator trolley the rollator-trolley comprising: a frame including at least two spaced apart interconnected lateral frame sides, wherein at a bottom side of each lateral frame side at least one front wheel and at least one rear wheel is provided, the frame further comprising a handle at a rear upper side of the frame continuously arranged between the two lateral frame sides, wherein the handle is adjustable between a rollator position, in which the handle is directed to a front side of the assembly, and a trolley position, in which the handle is directed towards a rear side of the assembly, wherein a transverse distance between the at least two lateral frame sides provides a free walking space between the at least two rear wheels in the rollator position, wherein the front wheels and the rear wheels define a support plane segment, that is bounded by contact points of the front and rear wheels with a supporting surface, wherein the assembly is configured such that in the rollator position the user walks inside the free walking space and the support plane segment during use, wherein each lateral frame side comprises a first lateral profile to which the rear wheel is mountable, and a second lateral profile to which the front wheel is mountable, the assembly further comprising a folding body provided between the second lateral profiles of the lateral frame sides, so that the assembly is adjustable between a folded-out position, in which the lateral frame sides are spaced apart, and a folded-in position, in which the lateral frame sides are located adjacent to each other, and wherein the lateral frame sides extend in a longitudinal direction and are within the support plane segment defined by the front and rear wheels in the rollator position, and wherein a vertical loading force provided on the handle in the rollator position falls within the support plane segment; the method comprising:
- unlocking the assembly from a locked state, in which folding of the assembly is blocked, to an unlocked state, in which the folding of the assembly is unblocked; and
- folding the assembly whereby the lateral frame sides are moved towards each other, until the lateral frame sides are located adjacent to each other.

13. The rollator-trolley assembly according to claim 1, wherein the handle is provided with at least three hinges to allow folding of the handle.

* * * * *